US012516325B2

(12) United States Patent
Thompson

(10) Patent No.: US 12,516,325 B2
(45) Date of Patent: Jan. 6, 2026

(54) COMPOSITION FOR REGULATING PRODUCTION OF INTERFERING RIBONUCLEIC ACID

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

( * ) Notice: Subject to any disclaimer, the term of this patent is extended or adjusted under 35 U.S.C. 154(b) by 0 days.

(21) Appl. No.: 18/931,873

(22) Filed: Oct. 30, 2024

(65) Prior Publication Data

US 2025/0163423 A1 May 22, 2025

Related U.S. Application Data

(62) Division of application No. 18/518,069, filed on Nov. 22, 2023.

(51) Int. Cl.
*C12N 15/113* (2010.01)
*C12N 15/86* (2006.01)

(52) U.S. Cl.
CPC .......... *C12N 15/1137* (2013.01); *C12N 15/86* (2013.01); *C12N 2310/141* (2013.01); *C12N 2750/14143* (2013.01); *C12Y 207/01* (2013.01)

(58) Field of Classification Search
CPC ................ C12N 15/1137; C12N 15/86; C12N 2310/141; C12N 2750/14143; C12Y 207/01
See application file for complete search history.

(56) References Cited

U.S. PATENT DOCUMENTS

| 11,085,055 | B2 | 8/2021 | Mallol et al. |
| 11,162,102 | B2 * | 11/2021 | Minshull ............... C12N 15/111 |
| 11,530,423 | B1 | 12/2022 | Thompson |
| 11,873,505 | B2 | 1/2024 | Thompson |
| 12,018,274 | B2 | 6/2024 | Thompson |
| 12,134,770 | B1 | 11/2024 | Thompson |

FOREIGN PATENT DOCUMENTS

CA 2721333 A1 10/2009

OTHER PUBLICATIONS

Fiona T van den Berg, et al., Molecular Therapy—Nucleic Acids, vol. 5, 2016 (Year: 2016).*
Denzler R et al., Mol Cell. Nov. 3, 2016;64(3):565-579 (Year: 2016).*
O'Brien, et al., Aug. 3, 2018, Front Endocrinol (Lausanne), 9:402, p. 1-12; Fig. 1; p. 2, "Biogenesis of miRNAs" (Year: 2018).*
Gorski, S., Vogel, J. & Doudna, J., Nat Rev Mol Cell Biol 18, 215-228 (2017) (Year: 2017).*
GenBank EGF Sequence Nov. 2023 version (Year: 2023).*
Nature (2010. Gene Expression. Scitable. Available online at Nature. com. Accessed Dec. 23, 2024) <https://www.nature.com/scitable/topicpage/gene-expression-14121669> (Year: 2010).*
Tritschler (et al. 2019. Concepts and limitations for learning developmental trajectories from single cell genomics. Development 146: dev170506) (Year: 2019).*
GenBank EGFR Sequence Nov. 2023 version (Year: 2023).*
Bottoni et al. "Targeting BTK through microRNA in chronic lymphocytic leukemia." Blood, The Journal of the American Society of Hematology 128.26 (2016): 3101-3112.
Brutons Tyrosine Kinase Genbank Sequence (Year: 2023).
Christensen et al. "Recombinant adeno-associated virus-mediated microRNA delivery into the postnatal mouse brain reveals a role for miR-134 in dendritogenesis in vivo." Frontiers in neural circuits 3 (2010): 848.
Bofill-De Ros et al. "Guidelines for the optimal design of miRNA-based shRNAs." Methods 103 (2016): 157-166.
NCBI Nucleotide Sequence ALK Lingand, search performed Dec. 26, 2024 (2023).
Ahmadzadeh et al. "BRAF mutation in hairy cell leukemia." Oncology reviews 8.2 (2014): 253.
Patton et al. "Biogenesis, delivery, and function of extracellular RNA." Journal of extracellular vesicles 4.1 (2015): 27494.
Clark et al. "Detection of BRAF splicing variants in plasma-derived cell-free nucleic acids and extracellular vesicles of melanoma patients failing targeted therapy therapies." Oncotarget 11.44 (2020): 4016.
NCBI Search results for SEQ ID No. 5 2024.
GenBank EGFR Sequence (2023).
Genbank FLT3 Sequence (2024).
NCBI Nucleotide Sequence for PARP, search performed Dec. 26, 2024 (2024).
Lam (et al. 2015. siRNA Versus miRNA as Therapeutics for Gene Silencing. Molec. Ther. Nuc. Ac. 4:e252) (Year: 2015).
Ying (et al. 2008. The MicroRNA (miRNA): Overview of the RNA Genes that Modulate Gene Function. Mol. Biotechnol. 38:257-268) (Year: 2008).
*Homo sapiens* VEGF, mRNA, NCBI Reference Sequence, version Oct. 2023, 9 pages, retrieved from the internet Jul. 2, 2025 (Year: 2023).
Pagliuca (et al. 2013. Analysis of the combined action of miR-143 and miR-145 on oncogenic pathways in colorectal cancer cells reveals a coordinate program of gene repression. Oncogene 32:4806-4813) (Year: 2013.

(Continued)

*Primary Examiner* — Ram R Shukla
*Assistant Examiner* — Shabana S Meyering
(74) *Attorney, Agent, or Firm* — Gowling WLG (Canada) LLP

(57) ABSTRACT

The embodiments of the present disclosure relate to decreasing the bioavailability of one or more target biomolecules by providing a composition that comprises a recombinant plasmid with one or more sequences of micro interfering ribonucleic acid (miRNA). When the recombinant plasmid interacts with a target cell, it causes the target cell to upregulate production of the miRNA, which then decreases the bioavailability of the target biomolecule. In some embodiments of the present disclosure, the target biomolecule is a kinase.

3 Claims, No Drawings
Specification includes a Sequence Listing.

(56) References Cited

OTHER PUBLICATIONS

Fattore (et al. 2016. miR-579-3p controls melanoma progression and resistance to target therapy. PNAS 113 [34]:E5005-E5013) (Year: 2016).

Origene (2024. Product datasheet for SC207797 B Raf [BRAF] [NM_004333] Human 3' UTR Clone. Rockville, MD: Origene) (Year: 2024).

NCBI (*Homo sapiens* B-Raf proto-oncogene, serine/threonine kinase [BRAF], transcript variants 1-2, 4-14, mRNA: [see reference for NM number]. Available online at NCBI.nlm.nih.gov. Accessed on May 16, 2025 (Year: 2025).

MiRbase (2025. "miR-143" and "miR-145", and "miR-579-3p". Available online at miRbase.org. Accessed on May 16, 2025) (Year: 2025).

Kondratov et al. "Direct head-to-head evaluation of recombinant adeno-associated viral vectors manufactured in human versus insect cells." Molecular Therapy 25.12 (2017): 2661-2675.

Wang et al. "Adeno-associated virus vector as a platform for gene therapy delivery". Nat Rev Drug Discov. May 2019;18(5):358-378. (Year: 2019).

NCBI Nucleotide Sequence ALK Receptor, search performed Dec. 26, 2024 (2023).

\* cited by examiner

COMPOSITION FOR REGULATING PRODUCTION OF INTERFERING RIBONUCLEIC ACID

CROSS REFERENCE TO RELATED APPLICATION

The present application is a division of U.S. patent application Ser. No. 18/518,069 filed Nov. 22, 2023, entitled "Composition For Regulating Production Of Interfering Ribonucleic Acid" currently pending, the entirety of which is incorporated herein by reference.

SEQUENCE LISTING

This application contains a Sequence Listing electronically submitted via Patent Center to the United States Patent and Trademark Office as an XML Document file entitled "A8149358US—Sequence Listing.xml" created on 2023 Nov. 17 and having a size of 75,546 bytes. The information contained in the Sequence Listing is incorporated by reference herein.

TECHNICAL FIELD

The present disclosure generally relates to compositions for regulating production of interfering ribonucleic acid (RNA). In particular, the present disclosure relates to compositions for regulating gene expression and therefore, the production of interfering RNA that will suppress over-expression or mis-expression of kinases.

BACKGROUND

Bioactive molecules, including kinases, are necessary for the homeostatic control of biological systems.

When bioactive molecules are over-expressed or mis-expressed, homeostasis is lost, and disease is often the result.

As such, it may be desirable to establish therapies, treatments and/or interventions that address when homeostasis and regulation of bioactive molecules is lost to prevent or treat the resulting disease.

SUMMARY

Some embodiments of the present disclosure relate to one or more compositions that upregulate the production of one or more sequences of micro interfering ribonucleic acid (miRNA). The sequences of miRNA may be complimentary to a sequence of target messenger RNA (mRNA) that encodes for translation of a target biomolecule and the miRNA can cause the bioavailability of the target mRNA to decrease because it is degraded or inactivated by the miRNA, thereby causing a decrease in bioactivity of the target biomolecule within a subject that is administered the one or more compositions. In some embodiments of the present disclosure, the target biomolecule is a kinase. In some embodiments of the present disclosure, the target biomolecule is a kinase such as Bruton's tyrosine kinase. In some embodiments of the present disclosure, the target biomolecule is a kinase such as epidermal growth factor (EGF). In some embodiments of the present disclosure, the target biomolecule is a kinase such as vascular endothelial growth factor (VEGF). In some embodiments of the present disclosure, the target biomolecule is a kinase such as B-Raf. In some embodiments of the present disclosure, the target biomolecule is a kinase such as anaplastic lymphoma kinase (ALK). In some embodiments of the present disclosure, the target biomolecule is a kinase such as human epidermal growth factor receptor (HER). In some embodiments of the present disclosure, the target biomolecule is a kinase such as Fms-like tyrosine kinase 3 (FLT3). In some embodiments of the present disclosure, the target biomolecule is a kinase such as poly-ADP ribose polymerase (PARP).

In some embodiments of the present disclosure the compositions comprise a plasmid of deoxyribonucleic acid (DNA) that includes one or more insert sequences of nucleic acids that encode for the production of miRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the miRNA and, therefore, decreased translation or production of the target biomolecule by one or more of the subject's cells.

Some embodiments of the present disclosure relate to compositions that upregulate the production of miRNA that degrades, or causes degradation of, or inactivates or causes the inactivation of, the target mRNA of the target biomolecule.

Some embodiments of the present disclosure relate to a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding a miRNA sequence that targets mRNA of Bruton's tyrosine kinase.

Some embodiments of the present disclosure relate to a recombinant plasmid. In some embodiments of the present disclosure, the RP comprises a nucleotide sequence of SEQ ID NO. 1 and SEQ ID NO. 3. The RP comprises a nucleotide sequence encoding one or more nucleotide sequences encoding a miRNA sequence that targets mRNA of EGF.

Some embodiments of the present disclosure relate to a recombinant plasmid. In some embodiments of the present disclosure, the RP comprises a nucleotide sequence of SEQ ID NO. 1 and SEQ ID NO. 4. The RP comprises a nucleotide sequence encoding one or more nucleotide sequences encoding a miRNA sequence that targets mRNA of VEGF.

Some embodiments of the present disclosure relate to a recombinant plasmid. In some embodiments of the present disclosure, the RP comprises a nucleotide sequence of SEQ ID NO. 1 and SEQ ID NO. 5. The RP comprises a nucleotide sequence encoding one or more nucleotide sequences encoding a miRNA sequence that targets mRNA of BRAF.

Some embodiments of the present disclosure relate to a recombinant plasmid. In some embodiments of the present disclosure, the RP comprises a nucleotide sequence of SEQ ID NO. 1 and SEQ ID NO. 6. The RP comprises a nucleotide sequence encoding one or more nucleotide sequences encoding a miRNA sequence that targets mRNA of ALK.

Some embodiments of the present disclosure relate to a recombinant plasmid. In some embodiments of the present disclosure, the RP comprises a nucleotide sequence of SEQ ID NO. 1 and SEQ ID NO. 7. The RP comprises a nucleotide sequence encoding one or more nucleotide sequences encoding a miRNA sequence that targets mRNA of HER.

Some embodiments of the present disclosure relate to a recombinant plasmid. In some embodiments of the present disclosure, the RP comprises a nucleotide sequence of SEQ ID NO. 1 and SEQ ID NO. 8. The RP comprises a nucleotide sequence encoding one or more nucleotide sequences encoding a miRNA sequence that targets mRNA of FLT3.

Some embodiments of the present disclosure relate to a recombinant plasmid. In some embodiments of the present disclosure, the RP comprises a nucleotide sequence of SEQ ID NO. 1 and SEQ ID NO. 9. The RP comprises a nucleotide sequence encoding one or more nucleotide sequences encoding a miRNA sequence that targets mRNA of PARP.

Some embodiments of the present disclosure relate to a method of making a composition/target cell complex. The method comprising a step of administering a RP comprising SEQ ID NO. 1 and one of SEQ ID NO. 2, SEQ ID NO. 3, SEQ ID NO. 4, SEQ ID NO. 5, SEQ ID NO. 6, SEQ ID NO. 7, SEQ ID NO. 8, or SEQ ID NO. 9, to a target cell for forming the composition/target cell complex, wherein the composition/target cell complex causes the target cell to increase production of one or more sequences of miRNA that decreases production of a target biomolecule.

Embodiments of the present disclosure relate to at least one approach for inducing endogenous production of one or more sequences of miRNA that target and silence mRNA of a target biomolecule, for example Bruton's tyrosine kinase. A first approach utilizes gene vectors containing nucleotide sequences for increasing the endogenous production of one or more sequences of miRNA, which are complete or partial sequences and/or combinations thereof, that target and silence the mRNA of Bruton's tyrosine kinase, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example EGF. A first approach utilizes gene vectors containing nucleotide sequences for increasing the endogenous production of one or more sequences of miRNA, which are complete or partial sequences and/or combinations thereof, that target and silence the mRNA of EGF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example VEGF. A first approach utilizes gene vectors containing nucleotide sequences for increasing the endogenous production of one or more sequences of miRNA, which are complete or partial sequences and/or combinations thereof, that target and silence the mRNA of VEGF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example BRAF. A first approach utilizes gene vectors containing nucleotide sequences for increasing the endogenous production of one or more sequences of miRNA, which are complete or partial sequences and/or combinations thereof, that target and silence the mRNA of BRAF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example ALK. A first approach utilizes gene vectors containing nucleotide sequences for increasing the endogenous production of one or more sequences of miRNA, which are complete or partial sequences and/or combinations thereof, that target and silence the mRNA of ALK, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example HER. A first approach utilizes gene vectors containing nucleotide sequences for increasing the endogenous production of one or more sequences of miRNA, which are complete or partial sequences and/or combinations thereof, that target and silence the mRNA of HER, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example FLT3. A first approach utilizes gene vectors containing nucleotide sequences for increasing the endogenous production of one or more sequences of miRNA, which are complete or partial sequences and/or combinations thereof, that target and silence the mRNA of FLT3, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example PARP. A first approach utilizes gene vectors containing nucleotide sequences for increasing the endogenous production of one or more sequences of miRNA, which are complete or partial sequences and/or combinations thereof, that target and silence the mRNA of PARP, which can be administered to a subject to increase the subject's production of one or more sequences of the miRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue, and/or biological fluids.

As used therein, the term "target biomolecule" refers to a kinase that is found within a subject. A biomolecule may be endogenous or exogenous to a subject.

As used therein, the term "target cell" refers to one or more cells and/or cell types that are deleteriously affected, either directly or indirectly, by a dysregulated biomolecule. The term "target cell" also refers to cells that are not deleteriously affected but that are the cells in which it is desired that the composition interacts.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, a composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus vector.

In some embodiments of the present disclosure, the insert comprises one or more nucleotide sequences that encode for production of at least one sequence of miRNA that decreases the production of target biomolecules. The miRNA may, directly or indirectly, bind to and degrade the target mRNA or otherwise inactivate the target mRNA so that less or none of the target-biomolecule protein is produced.

In some embodiments of the present disclosure, the target biomolecule is Bruton's tyrosine kinase.

In some embodiments of the present disclosure, the target biomolecule is EGF.

In some embodiments of the present disclosure, the target biomolecule is VEGF.

In some embodiments of the present disclosure, the target biomolecule is BRAF.

In some embodiments of the present disclosure, the target biomolecule is ALK.

In some embodiments of the present disclosure, the target biomolecule is HER.

In some embodiments of the present disclosure, the target biomolecule is FLT3.

In some embodiments of the present disclosure, the target biomolecule is PARP.

In some embodiments of the present disclosure, the insert comprises one or more nucleotide sequences that each encode one or more miRNA sequences that may be complimentary to and degrade, or cause degradation of, mRNA of the target biomolecule.

Some embodiments of the present disclosure relate to a composition that can be administered to a subject with a condition that results, directly or indirectly, from the production of a dysregulated biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing production and/or functionality of one or more intermediary molecules by changing production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both one or more sequences of miRNA that each target the mRNA of one or more target biomolecules. In some embodiments of the present disclosure, there are one, two, three, four, five, or six miRNA sequences that each are complimentary to and degrade, or cause degradation of, one biomolecule, such as Bruton's tyrosine kinase, EGF, VEGF, BRAF, ALK, HER, FLT3, or PARP. In some embodiments of the present disclosure, the composition may comprise multiple copies of the same nucleotide sequence of miRNA.

In some embodiments of the present disclosure, the composition is an RP that may be used for gene therapy. The gene therapy is useful for increasing the subject's endogenous production of one or more sequences of miRNA that target the mRNA of a target biomolecule. For example, the RP can contain one or more nucleotide sequences that cause increased production of one or more nucleotide sequences that cause an increased production of one or more miRNA sequences that are each complimentary to and degrade, or cause degradation of, or inactivate, or cause inactivation of, one biomolecule, such as Bruton's tyrosine kinase, EGF, VEGF, BRAF, ALK, HER, FLT3, or PARP. Increased endogenous expression of the one or more miRNA sequences results in a decreased bioavailability of the desired biomolecule, which may also be referred to as a target biomolecule.

In some embodiments of the present disclosure, the delivery vehicle of the RP used for gene therapy may be a virus that can be enveloped, or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus Dependoparvovirus. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1\times10^{16}$ TCID$_{50}$/kg (50% tissue culture infective dose per kilogram of the patient's body mass. In some embodiments of the present disclosure, the therapeutically effective amount of the composition that is administered to the patient is about $1\times10^{13}$ TCID$_{50}$/kg. In some embodiments of the present disclosure, the therapeutically effective amount of the composition that is administered to a patient is measured in TPC/kg (total particle count of the composition per kilogram of the patient's body mass). In some embodiments the therapeutically effective amount of the composition is between about 10 and about $1\times10^{16}$ TCP/kg.

Some embodiments of the present disclosure relate to an adenovirus associated virus (AAV) genome consisting of a RP that when operable inside a target cell will cause the target cell to produce a miRNA sequence that downregulates production of a biomolecule, with examples being Bruton's tyrosine kinase, EGF, VEGF, BRAF, ALK, HER, FLT3, or PARP. The RP is comprised of AAV2 inverted terminal repeats (ITRs), a composite CASI promoter, a human growth hormone (HGH) signal peptide followed by a miRNA expression cassette containing up to six different miRNAs targeting Bruton's tyrosine kinase, EGF, VEGF, BRAF, ALK, HER, FLT3, or PARP, followed by a Woodchuck Hepatitis Virus post-transcriptional regulatory element (WPRE) and an SV40 polyA signal.

```
SEQ ID NO. 1 (backbone sequence No. 1):
5' aatcaacctctggattacaaaatttgtgaaagattgactggtattcttaactatgtt gctcctttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttccgggactttcgctttcccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccttgggccgcctccccgcctaagctt
```

-continued

```
atcgataccgtcgagatctaacttgtttattgcagcttataatggttacaaataaagcaa tagcatcacaaatttcacaaataaagcattttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctccctttagggttccgatttagtgc tttacggcacctcgaccccaaaaaacttgattagggtgatggttcacgtagtgggccatc gccctgatagacggtttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggccttctcacccgtttgaatctttacct acacattactcaggcattgcatttaaaatatatgagggttctaaaaatttttatccttgc gttgaaataaaggcttctcccgcaaaagtattacagggtcataatgttttggtacaacc gatttagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aaccccatttgtttattttttctaaatacattcaaatatgtatccgctcatgagacaata accctgataaatgcttcaataatattgaaaaaggaagagtatgagtattcaacatttccg tgtcgcccttattccctttttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac
```

-continued

```
agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcattttaatt taaaaggatctaggtgaagatcctttttgataatctcatgaccaaaatcccttaacgtga gttttcgttccactgagcgtcagacccgtagaaaagatcaaaggatcttcttgagatcc ttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctcccccc cctccccaccccaattttgtatttatttattttttaattattttgtgcagcgatggggg cgggggggggggggcgcgcgccaggcggggcggggcgggcgaggggcggggcgggc gaggcggagaggtgcggcggcagccaatcagagcggcgcgctccgaaagtttccttttat ggcgaggcggcggcggcggcggccctataaaaagcgaagcgcgcggcgggcgggagtcgc tgcgcgctgccttcgccccgtgccccgctccgccgccgcctcgccgccccgccccggct ctgactgaccgcgttactaaaacaggtaagtccggcctccgcgccgggttttggcgcctc
```

-continued ccgcgggcgccccctcctcacggcgagcgctgccacgtcagacgaagggcgcagcgagc gtcctgatccttccgcccggacgctcaggacagcggcccgctgctcataagactcggcct tagaaccccagtatcagcagaaggacattttaggacgggacttgggtgactctagggcac tggttttctttccagagagcggaacaggcgaggaaaagtagtcccttctcggcgattctg cggagggatctccgtggggcggtgaacgccgatgatgcctctactaaccatgttcatgtt ttcttttttttttctacaggtcctgggtgacgaacagggtaccgccaccatggccaccggc tctcgcacaagcctgctgctggctttcggactgctgtgcctgccttggctccaggagggc tccgcc 3'

SEQ ID NO. 2 (miRNA expression cassette No. 2 - Bruton's tyrosine kinase):
5' gctagcatcgataccgtcgctatgtgctggaggcttgctgaaggctgtatgctgtaa ggtggttatgggagaatgccgttttggcctctgactgacggcattctcctaaccactta caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtctatcctttcaagctagt caccgttttggcctctgactgacggtgactagcgaaaggatagacaggacacaaggcctg ttactagcactcacatggaacaaatggcctctctagaat 3'

SEQ ID NO. 3 (miRNA expression cassette No. 3 - EGF):

5' gctagcatcgataccgtcgctatgtgctggaggcttgctgaaggctgtatgctgaag ttagcatgtgtcccagaaccgttttggcctctgactgacggttctgggacatgctaactt caggacacaaggcctgttactagcactcacatggaacaaatggcctctagcctggaggct tgctgaaggctgtatgctgagaagaaaggtatcccaattgccgttttggcctctgactga cggcaattgggacctttcttctcaggacacaaggcctgttactagcactcacatggaaca aatggcctctagcctggaggcttgctgaaggctgtatgctgtagtgtttccaaatactgc ttgcgttttggcctctgactgacgcaagcagtatggaaacactacaggacacaaggcctg ttactagcactcacatggaacaaatggcctctctagaat 3'

SEQ ID NO. 4 (miRNA expression cassette No. 4 - VEGF):
5' gctagcatcgataccgtcgctatgtgctggaggcttgctgaaggctgtatgctgtct gacagtgatgtcatcctttcgttttggcctctgactgacgaaaggatgatcactgtcaga caggacacaaggcctgttactagcactcacatggaacaaatggcctctagcctggaggct tgctgaaggctgtatgctgatttaggtcagatggaaactcgcgttttggcctctgactga cgcgagtttccctgacctaaatcaggacacaaggcctgttactagcactcacatggaaca aatggcctctagcctggaggcttgctgaaggctgtatgctgagtgtatgcttaacgtgga cttcgttttggcctctgactgacgaagtccacgaagcatacactcaggacacaaggcctg ttactagcactcacatggaacaaatggcctctctagaat 3'

SEQ ID NO. 5 (miRNA expression cassette No. 5 - BRAF):
5' gctagcatcgataccgtcgctatgtgctggaggcttgctgaaggctgtatgctgata cttcagcctgaatcgtgaccgttttggcctctgactgacggtcacgattggctgaagtat caggacacaaggcctgttactagcactcacatggaacaaatggcctctagcctggaggct tgctgaaggctgtatgctgacttcactcatattgttccactcgttttggcctctgactga cgagtggaacaatgagtgaagtcaggacacaaggcctgttactagcactcacatggaaca aatggcctctagcctggaggcttgctgaaggctgtatgctgtatattctacaaatcacca gggcgttttggcctctgactgacgccctggtgatgtagaatatacaggacacaaggcctg ttactagcactcacatggaacaaatggcctctctagaat 3'

SEQ ID NO. 6 (miRNA expression cassette No. 6 - ALK):
5' gctagcatcgataccgtcgctatgtgctggaggcttgctgaaggctgtatgctgtat aagtccagtgagaagaaggcgttttggcctctgactgacgccttcttctctggacttata caggacacaaggcctgttactagcactcacatggaacaaatggcctctagcctggaggct tgctgaaggctgtatgctgctatcatcaaatgagctgctgcgttttggcctctgactgac gcagcagctcttgatgatagtcaggacacaaggcctgttactagcactcacatggaacaa atggcctctagcctggaggcttgctgaaggctgtatgctgaagactgctggaaattctat ggctgttttggcctctgactgacgaccatagaatccagcagtctcaggacacaaggcctg ttactagcactcacatggaacaaatggcctctctagaat 3'

SEQ ID NO. 7 (miRNA expression cassette No. 7 - HER):
5' gctagcatcgataccgtcgctatgtgctggaggcttgctgaaggctgtatgctgatt agcactggtgatttccggctgttttggcctctgactgacgaccggaaatccagtgctaat caggacacaaggcctgttactagcactcacatggaacaaatggcctctagcctggaggct tgctgaaggctgtatgctgattgagtttcgcattcttgttgccgttttggcctctgactg acggcaacaagagcgaaactcaacaggacacaaggcctgttactagcactcacatggaac aaatggcctctagcctggaggcttgctgaaggctgtatgctgattgatcaggcaaacata gtcccgttttggcctctgactgacgggactatgtgcctgatcaatcaggacacaaggcct gttactagcactcacatggaacaaatggcctctctagaat 3'

SEQ ID NO. 8 (miRNA expression cassette No. 8 - FLT3):
5' gctagcatcgataccgtcgctatgtgctggaggcttgctgaaggctgtatgctgtct gatcgtggtgttatttgggcgttttggcctctgactgacgcccaaataaccacgatcaga caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtatcctcttataactcagc ctccgttttggcctctgactgacggaggctgagataagaggatacaggacacaaggcctg ttactagcactcacatggaacaaatggcctctctagaat 3'

SEQ ID NO. 9 (miRNA expression cassette No. 9 - PARP):
5' gctagcatcgataccgtcgctatgtgctggaggcttgctgaaggctgtatgctgtcg tactgacttgtaggtatgccgttttggcctctgactgacggcatacctaagtcagtacgt caggacacaaggcctgttactagcactcacatggaacaaatggcctctagcctggaggct tgctgaaggctgtatgctgactcctaatcaatagcttccaccgttttggcctctgactga cggtggaagcttgattaggagtcaggacacaaggcctgttactagcactcacatggaaca aatggcctctagcctggaggcttgctgaaggctgtatgctgaatatgcctttaagctttg ctgcgttttggcctctgactgacgcagcaaagcaaggcatattcaggacacaaggcctg ttactagcactcacatggaacaaatggcctctctagaat 3'

SEQ ID NO: 10 = SEQ ID NO: 1 + SEQ ID NO: 2
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag -continued

```
ttgtggcccgttgtcaggcaacgtggcgtggtgtgcactgtgtttgctgacgcaaccccc
actggttggggcattgccaccacctgtcagctccttccgggacttccgctttcccctc
cctattgccacggcggaactcatcgccgcctgccttgcccgctgctggacaggggctcgg
ctgttgggcactgacaattccgtggtgttgtcggggaaatcatcgtcctttccttggctg
ctcgcctgtgttgccacctggattctgcgcgggacgtccttctgctacgtcccttcggcc
ctcaatccagcggaccttccttcccgcggcctgctgccggctctgcggcctcttccgcgt
cttcgccttcgccctcagacgagtcggatctccctttgggccgcctccccgcctaagctt
atcgataccgtcgagatctaacttgtttattgcagcttataatggttacaaataaagcaa
tagcatcacaaatttcacaaataaagcattttttcactgcattctagttgtggtttgtc
caaactcatcaatgtatcttatcatgtctggatctcgacctcgactagagcatggctacg
tagataagtagcatggcgggttaatcattaactacaaggaacccctagtgatggagttgg
ccactccctctctgcgcgctcgctcgctcactgaggccgggcgaccaaaggtcgcccgac
gcccgggctttgccccggcggcctcagtgagcgagcgagcgcgcagctggcgtaatagcg
aagagcccgcaccgatcgcccttcccaacagttgcgcagcctgaatggcgaatggcgat
tccgttgcaatggctggcggtaatattgttctggatattaccagcaaggccgatagtttg
agttcttctactcaggcaagtgatgttattactaatcaaagaagtattgcgacaacggtt
aatttgcgtgatggacagactcttttactcggtggcctcactgattataaaaacacttct
caggattctggcgtaccgttcctgtctaaaatccctttaatcggcctcctgtttagctcc
cgctctgattctaacgaggaaagcacgttatacgtgctcgtcaaagcaaccatagtacgc
gccctgtagcggcgcattaagcgcggcgggtgtggtggttacgcgcagcgtgaccgctac
acttgccagcgccctagcgcccgctccttcgcttcttcccttcctttctcgccacgtt
cgccggctttccccgtcaagctctaaatcgggggctccctttagggttccgatttagtgc
tttacggcacctcgaccccaaaaaacttgattagggtgatggttcacgtagtgggccatc
gccctgatagacggttttcgccctttgacgttggagtccacgttctttaatagtggact
cttgttccaaactggaacaacactcaaccctatctcggtctattctttgatttataagg
gattttgccgatttcggcctattggttaaaaaatgagctgatttaacaaaaatttaacgc
gaattttaacaaaatattaacgtttacaattaaatatttgcttatacaatcttcctgtt
tttgggcttttctgattatcaaccggggtacatatgattgacatgctagttttacgatt
accgttcatcgattctcttgtttgctccagactctcaggcaatgacctgatagcctttgt
agagacctctcaaaaatagctaccctctccggcatgaatttatcagctagaacggttgaa
tatcatattgatggtgatttgactgtctccggccttctcacccgtttgaatctttacct
acacattactcaggcattgcatttaaaatatatgagggttctaaaaatttttatccttgc
gttgaaataaaggcttctcccgcaaaagtattacagggtcataatgttttggtacaacc
gatttagctttatgctctgaggctttattgcttaattttgctaattctttgccttgcctg
tatgatttattggatgttggaattcctgatgcggtattttctccttacgcatctgtgcgg
tatttcacaccgcatatggtgcactctcagtacaatctgctctgatgccgcatagttaag
ccagccccgacaccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctatttttataggttaa
tgtcatgataataatggtttcttagacgtcaggtggcacttttcggggaaatgtgcgcgg
aacccctatttgtttatttttctaaatacattcaaatatgtatccgctcatgagacaata
```

-continued accctgataaatgcttcaataatattgaaaaaggaagagtatgagtattcaacatttccg tgtcgcccttattccctttttttgcggcattttgccttcctgttttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatactttagattgatttaaaacttcattttttaatt taaaaggatctaggtgaagatcctttttgataatctcatgaccaaaatcccttaacgtga gttttcgttccactgagcgtcagacccccgtagaaaagatcaaaggatcttcttgagatcc ttttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca -continued tcgctattaccatggtcgaggtgagccccacgttctgcttcactctccccatctccccccc cctcccaccccaattttgtatttatttattttttaattattttgtgcagcgatgggggg cggggggggggggggcgcgcgccaggcggggcggggcggggcgaggggcggggcgggggc gaggcggagaggtgcggcggcagccaatcagagcggcgcgctccgaaagtttccttttat ggcgaggcggcggcggcggcggccctataaaaagcgaagcgcgcgggcggcggagtcgc tgcgcgctgccttcgcccgtgccccgctccgccgccgcctcgccgcccgccccggct ctgactgaccgcgttactaaaacaggtaagtccggcctccgcgccgggttttggcgcctc ccgcgggcgcccccctcctcacggcgagcgctgccacgtcagacgaagggcgcagcgagc gtcctgatccttccgcccggacgctcaggacagcggcccgctgctcataagactcggcct tagaacccagtatcagcagaaggacattttaggacgggacttgggtgactctagggcac tggttttctttccagagagcggaacaggcgaggaaaagtagtcccttctcggcgattctg cggagggatctccgtggggcggtgaacgccgatgatgcctctactaaccatgttcatgtt ttctttttttttctacaggtcctgggtgacgaacagggtaccgccaccatggccaccggc tctcgcacaagcctgctgctggctttcggactgctgtgcctgccttggctccaggagggc tccgccgctagcatcgataccgtcgctatgtgctggaggcttgctgaaggctgtatgctg taaggtggttatgggagaatgccgttttggcctctgactgacggcattctcctaaccacc ttacaggacacaaggcctgttactagcactcacatggaacaaatggcctctagcctggag gcttgctgaaggctgtatgctgttgagtttcgcattcttgttgccgttttggcctctgac tgacggcaacaagagcgaaactcaacaggacacaaggcctgttactagcactcacatgga acaaatggcctctagcctggaggcttgctgaaggctgtatgctgtctatcctttcaagct agtcaccgttttggcctctgactgacggtgactagcgaaaggatagacaggacacaaggc ctgttactagcactcacatggaacaaatggcctctctagaat 3'

SEQ ID NO: 11 = SEQ ID NO: 1 + SEQ ID NO: 3
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccccc actggttggggcattgccaccacctgtcagctcctttccgggactttcgctttcccctc cctattgccacggcggaactcatcgccgcctgccttgcccgctgctggacaggggctcgg ctgttgggcactgacaattccgtggtgttgtcggggaaatcatcgtccttcccttggctg ctcgcctgtgttgccacctggattctgcgcgggacgtccttctgctacgtccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg -continued

```
agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttccttcctttctcgccacgtt cgccggctttccccgtcaagctctaaatcgggggctccctttaggttccgatttagtgc tttacggcacctcgaccccaaaaaacttgatagggtgatggttcacgtagtgggccatc gccctgatagacggttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaattttttatccttgc gttgaaataaaggcttctcccgcaaaagtattacagggtcataatgttttggtacaacc gatttagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aaccctatttgtttatttttctaaatacattcaaatatgtatccgctcatgagacaata accctgataaatgcttcaataatattgaaaaaggaagagtatgagtattcaacatttccg tgtcgcccttattccctttttgcggcattttgccttcctgttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgctttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta
```

-continued

```
actgtcagaccaagtttactcatatatactttagattgatttaaaacttcattttttaatt
taaaaggatctaggtgaagatcctttttgataatctcatgaccaaaatcccttaacgtga
gttttcgttccactgagcgtcagaccccgtagaaaagatcaaaggatcttcttgagatcc
ttttttctgcgcgtaatctgctgcttgcaaacaaaaaaaccaccgctaccagcggtggt
ttgtttgccggatcaagagctaccaactctttttccgaaggtaactggcttcagcagagc
gcagataccaaatactgtccttctagtgtagccgtagttaggccaccacttcaagaactc
tgtagcaccgcctacatacctcgctctgctaatcctgttaccagtggctgctgccagtgg
cgataagtcgtgtcttaccgggttggactcaagacgatagttaccggataaggcgcagcg
gtcgggctgaacggggggttcgtgcacacagcccagcttggagcgaacgacctacaccga
actgagatacctacagcgtgagctatgagaaagcgccacgcttcccgaagggagaaaggc
ggacaggtatccggtaagcggcagggtcggaacaggagagcgcacgagggagcttccagg
gggaaacgcctggtatctttatagtcctgtcgggtttcgccacctctgacttgagcgtcg
atttttgtgatgctcgtcaggggggcggagcctatggaaaaacgccagcaacgcggcctt
tttacggttcctggccttttgctggccttttgctcacatgttctttcctgcgttatcccc
tgattctgtggataaccgtattaccgcctttgagtgagctgataccgctcgccgcagccg
aacgaccgagcgcagcgagtcagtgagcgaggaagcggaagagcgcccaatacgcaaacc
gcctctccccgcgcgttggccgattcattaatgcagcagctgcgcgctcgctcgctcact
gaggccgcccgggcaaagcccgggcgtcgggcgaccttggtcgcccggcctcagtgagc
gagcgagcgcgcagagagggagtggccaactccatcactaggggttccttgtagttaatg
attaacccgccatgctacttatctacgtagccatgctctaggacattgattattgactag
tggagttccgcgttacataacttacggtaaatggcccgcctggctgaccgcccaacgacc
cccgcccattgacgtcaataatgacgtatgttcccatagtaacgccaatagggactttcc
attgacgtcaatgggtggagtatttacggtaaactgcccacttggcagtacatcaagtgt
atcatatgccaagtacgccccctattgacgtcaatgacggtaaatggcccgcctggcatt
atgcccagtacatgaccttatgggactttcctacttggcagtacatctacgtattagtca
tcgctattaccatggtcgaggtgagccccacgttctgcttcactctccccatctccccc
cctccccaccccaattttgtatttatttattttttaattattttgtgcagcgatggggg
cgggggggggggggcgcgcgccaggcggggcggggcggggcgagggcggggcgggc
gaggcggagaggtgcggcggcagccaatcagagcggcgcgctccgaaagtttccttttat
ggcgaggcggcggcggcggcggccctataaaaagcgaagcgcgcggcgggcgggagtcgc
tgcgcgctgccttcgccccgtgccccgctccgccgccgcctcgcgccgcccgccccggct
ctgactgaccgcgttactaaaacaggtaagtccggcctccgcgccgggttttggcgcctc
ccgcgggcgccccctcctcacggcgagcgctgccacgtcagacgaagggcgcagcgagc
gtcctgatccttccgcccggacgctcaggacagcggcccgctgctcataagactcggcct
tagaacccagtatcagcagaaggacattttaggacgggacttgggtgactctagggcac
tggtttctttccagagagcggaacaggcgaggaaaagtagtcccttctcggcgattctg
cggagggatctccgtggggcggtaacgccgatgatgcctctactaaccatgttcatgtt
ttcttttttttttctacaggtcctgggtgacgaacagggtaccgccaccatggccaccggc
tctcgcacaagcctgctgctggctttcggactgctgtgcctgccttggctccaggagggc
tccgccgctagcatcgataccgtcgctatgtgctggaggcttgctgaaggctgtatgctg
```

-continued aagttagcatgtgtcccagaaccgttttggcctctgactgacggttctgggacatgctaa cttcaggacacaaggcctgttactagcactcacatggaacaaatggcctctagcctggag gcttgctgaaggctgtatgctgagaagaaaggtatcccaattgccgttttggcctctgac tgacggcaatt gggacctttcttctcaggacacaaggcctgttactagcactcacatgga acaaatggcctctagcctggaggcttgctgaaggctgtatgctgtagtgtttccaaatac tgcttgcgttttggcctctgactgacgcaagcagtatggaaacactacaggacacaaggc ctgttactagcactcacatggaacaaatggcctctctagaat 3'

SEQ ID NO: 12 = SEQ ID NO: 1 + SEQ ID NO: 4
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccccc actggttggggcattgccaccacctgtcagctccttccgggactttcgctttccccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaaccccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatcccttta atcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctccctttagggttccgatttagtgc tttacggcacctcgaccccaaaaaacttgattagggtgatggttcacgtagtgggccatc gccctgatagacggtttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa -continued

```
tatcatattgatggtgatttgactgtctccggcctttctcacccgtttgaatctttacct
acacattactcaggcattgcatttaaaatatatgagggttctaaaaattttatccttgc
gttgaaataaaggcttctcccgcaaaagtattacagggtcataatgtttttggtacaacc
gatttagctttatgctctgaggctttattgcttaattttgctaattctttgccttgcctg
tatgatttattggatgttggaattcctgatgcggtattttctccttacgcatctgtgcgg
tatttcacaccgcatatggtgcactctcagtacaatctgctctgatgccgcatagttaag
ccagccccgacacccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctattttataggttaa
tgtcatgataataatggtttcttagacgtcaggtggcacttttcggggaaatgtgcgcgg
aaccctatttgtttatttttctaaatacattcaaatatgtatccgctcatgagacaata
accctgataaatgcttcaataatattgaaaaaggaagagtatgagtattcaacatttccg
tgtcgcccttattcccttttttgcggcattttgccttcctgttttttgctcacccagaaac
gctggtgaaagtaaaagatgctgaagatcagttgggtgcacgagtgggttacatcgaact
ggatctcaacagcggtaagatccttgagagttttcgccccgaagaacgttttccaatgat
gagcacttttaaagttctgctatgtggcgcggtattatcccgtattgacgccgggcaaga
gcaactcggtcgccgcatacactattctcagaatgacttggttgagtactcaccagtcac
agaaaagcatcttacggatggcatgacagtaagagaattatgcagtgctgccataaccat
gagtgataacactgcggccaacttacttctgacaacgatcggaggaccgaaggagctaac
cgcttttttgcacaacatgggggatcatgtaactcgccttgatcgttgggaaccggagct
gaatgaagccataccaaacgacgagcgtgacaccacgatgcctgtagcaatggcaacaac
gttgcgcaaactattaactggcgaactacttactctagcttcccggcaacaattaataga
ctggatggaggcggataaagttgcaggaccacttctgcgctcggcccttccggctggctg
gtttattgctgataaatctggagccggtgagcgtgggtctcgcggtatcattgcagcact
ggggccagatggtaagccctcccgtatcgtagttatctacacgacggggagtcaggcaac
tatggatgaacgaaatagacagatcgctgagataggtgcctcactgattaagcattggta
actgtcagaccaagtttactcatatactttagattgatttaaaacttcattttaatt
taaaaggatctaggtgaagatcctttttgataatctcatgaccaaaatcccttaacgtga
gttttcgttccactgagcgtcagacccgtagaaaagatcaaaggatcttcttgagatcc
ttttttctgcgcgtaatctgctgcttgcaaacaaaaaaaccaccgctaccagcggtggt
ttgtttgccggatcaagagctaccaactctttttccgaaggtaactggcttcagcagagc
gcagataccaaatactgtccttctagtgtagccgtagttaggccaccacttcaagaactc
tgtagcaccgcctacatacctcgctctgctaatcctgttaccagtggctgctgccagtgg
cgataagtcgtgtcttaccgggttggactcaagacgatagttaccggataaggcgcagcg
gtcgggctgaacggggggttcgtgcacacagcccagcttggagcgaacgacctacaccga
actgagatacctacagcgtgagctatgagaaagcgccacgcttcccgaagggagaaaggc
ggacaggtatccggtaagcggcagggtcggaacaggagagcgcacgagggagcttccagg
gggaaacgcctggtatctttatagtcctgtcgggtttcgccacctctgacttgagcgtcg
atttttgtgatgctcgtcaggggggcggagcctatggaaaaacgccagcaacgcggcctt
tttacggttcctggccttttgctggccttttgctcacatgttctttcctgcgttatcccc
tgattctgtggataaccgtattaccgcctttgagtgagctgataccgctcgccgcagccg
```

-continued aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctcccaccccaattttgtatttatttattttttaattattttgtgcagcgatggggg cggggggggggggggcgcgcgccaggcggggcggggcggggcgaggggcggggcgggg gaggcggagaggtgcggcggcagccaatcagagcggcgcgctccgaaagtttccttttat ggcgaggcggcggcggcggcggccctataaaaagcgaagcgcgcggcgggcgggagtcgc tgcgcgctgccttcgcccgtgccccgctccgccgccgcctcgcgccgcccgccccggct ctgactgaccgcgttactaaaacaggtaagtccggcctccgcgccgggttttggcgcctc ccgcgggcgccccctcctcacggcgagcgctgccacgtcagacgaagggcgcagcgagc gtcctgatccttccgcccggacgctcaggacagcggcccgctgctcataagactcggcct tagaaccccagtatcagcagaaggacattttaggacgggacttgggtgactctagggcac tggttttctttccagagagcggaacaggcgaggaaaagtagtcccttctcggcgattctg cggagggatctccgtggggcggtaacgccgatgatgcctctactaaccatgttcatgtt ttctttttttttctacaggtcctgggtgacgaacagggtaccgccaccatggccaccggc tctcgcacaagcctgctgctggctttcggactgctgtgcctgccttggctccaggagggc tccgccgctagcatcgataccgtcgctatgtgctggaggcttgctgaaggctgtatgctg tctgacagtgatgtcatcctttcgttttggcctctgactgacgaaaggatgatcactgtc agacaggacacaaggcctgttactagcactcacatggaacaaatggcctctagcctggag gcttgctgaaggctgtatgctgatttaggtcagatggaaactcgcgttttggcctctgac tgacgcgagtttccctgacctaaatcaggacacaaggcctgttactagcactcacatgga acaaatggcctctagcctggaggcttgctgaaggctgtatgctgagtgtatgcttaacgt ggacttcgttttggcctctgactgacgaagtccacgaagcatacactcaggacacaaggc ctgttactagcactcacatggaacaaatggcctctctagaat 3'

SEQ ID NO: 13 = SEQ ID NO: 1 + SEQ ID NO: 5
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttccgggactttcgctttcccctc cctattgccacggcggaactcatcgccgcctgccttgcccgctgctggacagggctcgg ctgtgggcactgacaattccgtggtgttgtcggggaaatcatcgtccttttccttggctg ctcgcctgtgttgccacctggattctgcgcgggacgtccttctgctacgtcccttcggcc -continued

```
ctcaatccagcggaccttccttcccgcggcctgctgccggctctgcggcctcttccgcgt cttcgccttcgccctcagacgagtcggatctcccttttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctcccttTagggttccgatttagtgc tttacggcacctcgaccccaaaaaacttgattagggtgatggttcacgtagtgggccatc gccctgatagacggttttttgcccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaatttttatccttgc gttgaaataaaggcttctcccgcaaaagtattacagggtcataatgttttttggtacaacc gatttagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aaccccctatttgtttattttttctaaatacattcaaatatgtatccgctcatgagacaata accctgataaatgcttcaataatattgaaaaaggaagagtatgagtattcaacatttccg tgtcgcccttattcccttttttgcggcattttgccttcctgttttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat
```

-continued

```
gagcacttttaaagttctgctatgtggcgcggtattatcccgtattgacgccgggcaaga gcaactcggtcgccgcatacactattctcagaatgacttggttgagtactccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcatttttaatt taaaaggatctaggtgaagatcctttttgataatctcatgaccaaaatcccttaacgtga gttttcgttccactgagcgtcagaccccgtagaaaagatcaaaggatcttcttgagatcc ttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgaccttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaattttgtatttatttattttttaattattttgtgcagcgatggggg cggggggggggggggcgcgcgccaggcggggcggggcggggcgagggggcggggcgggc gaggcggagaggtgcggcggcagccaatcagagcggcgcgctccgaaagtttccttttat ggcgaggcggcggcggcggcggccctataaaaagcgaagcgcgcggcgggcgggagtcgc
```

-continued tgcgcgctgccttcgccccgtgccccgctccgccgccgcctcgccgccgcccgccccggct ctgactgaccgcgttactaaaacaggtaagtccggcctccgcgccgggttttggcgcctc ccgcgggcgccccctcctcacggcgagcgctgccacgtcagacgaagggcgcagcgagc gtcctgatccttccgcccggacgctcaggacagcggcccgctgctcataagactcggcct tagaaccccagtatcagcagaaggacattttaggacgggacttgggtgactctagggcac tggttttctttccagagagcggaacaggcgaggaaaagtagtcccttctcggcgattctg cggagggatctccgtggggcggtgaacgccgatgatgcctctactaaccatgttcatgtt ttcttttttttttctacaggtcctgggtgacgaacagggtaccgccaccatggccaccggc tctcgcacaagcctgctgctggctttcggactgctgtgcctgccttggctccaggagggc tccgccgctagcatcgataccgtcgctatgtgctggaggcttgctgaaggctgtatgctg atacttcagcctgaatcgtgaccgttttggcctctgactgacggtcacgattggctgaag tatcaggacacaaggcctgttactagcactcacatggaacaaatggcctctagcctggag gcttgctgaaggctgtatgctgacttcactcatattgttccactcgttttggcctctgac tgacgagtggaacaatgagtgaagtcaggacacaaggcctgttactagcactcacatgga acaaatggcctctagcctggaggcttgctgaaggctgtatgctgtatattctacaaatca ccagggcgttttggcctctgactgacgccctggtgatgtagaatatacaggacacaaggc ctgttactagcactcacatggaacaaatggcctctctagaat 3'

SEQ ID NO: 14 = SEQ ID NO: 1 + SEQ ID NO: 6
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccccc actggttggggcattgccaccacctgtcagctccttttccgggactttcgctttccccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtgcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac -continued

```
acttgccagcgccctagcgcccgctcctttcgctttcttcccttcctttctcgccacgtt cgccggctttccccgtcaagctctaaatcgggggctcccttlagggttccgatttagtgc tttacggcacctcgaccccaaaaaacttgatlagggtgatggttcacgtagtgggccatc gccctgatagacggttttlcgcccttlgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaattttlatccttgc gttgaaataaaggcttctcccgcaaaagtattacagggtcataatgttttlggtacaacc gatttagctttatgctctgaggctttattgcttaattttgctaattctttgccttgcctg tatgatttattggatgttggaattcctgatgcggtatttlctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctattttlataggttaa tgtcatgataataatggtttcttagacgtcaggtggcacttttcggggaaatgtgcgcgg aacccctatttgtttatttttctaaatacattcaaatatgtatccgctcatgagacaata accctgataaatgcttcaataatattgaaaaaggaagagtatgagtattcaacatttccg tgtcgcccttattccctttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcattttlaatt taaaaggatctaggtgaagatcctttttgataatctcatgaccaaaatcccttaacgtga gttttcgttccactgagcgtcagaccccgtagaaaagatcaaaggatcttcttgagatcc ttttttlctgcgcgtaatctgctgcttgcaaacaaaaaaaccaccgctaccagcggtggt
```

-continued

```
ttgtttgccggatcaagagctaccaactcttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg attttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaattttgtatttatttattttttaattattttgtgcagcgatggggg cggggggggggggggcgcgcgccaggcggggcggggcggggcgaggggcggggcgggc gaggcggagaggtgcggcggcagccaatcagagcggcgcgctccgaaagtttcctttat ggcgaggcggcggcggcggcggccctataaaaagcgaagcgcgcggcgggcgggagtcgc tgcgcgctgccttcgccccgtgccccgctccgccgccgcctcgccgcgcccgccccggct ctgactgaccgcgttactaaaacaggtaagtccggcctccgcgccgggttttggcgcctc ccgcgggcgcccccctcctcacggcgagcgctgccacgtcagacgaagggcgcagcgagc gtcctgatccttccgcccggacgctcaggacagcggcccgctgctcataagactcggcct tagaaccccagtatcagcagaaggacattttaggacgggacttgggtgactctagggcac tggttttctttccagagagcggaacaggcgaggaaaagtagtcccttctcggcgattctg cggagggatctccgtggggcggtaacgccgatgatgcctctactaaccatgttcatgtt ttcttttttttttctacaggtcctgggtgacgaacagggtaccgccaccatggccaccggc tctcgcacaagcctgctgctggctttcggactgctgtgcctgccttggctccaggagggc tccgccgctagcatcgataccgtcgctatgtgctggaggcttgctgaaggctgtatgctg tataagtccagtgagaagaaggcgttttggcctctgactgacgccttcttctctggactt atacaggacacaaggcctgttactagcactcacatggaacaaatggcctctagcctggag gcttgctgaaggctgtatgctgctatcatcaaatgagctgctgcgttttggcctctgact gacgcagcagctcttgatgatagtcaggacacaaggcctgttactagcactcacatggaa caaatggcctctagcctggaggcttgctgaaggctgtatgctgaagactgctggaaattc
```

-continued tatggctgttttggcctctgactgacgaccatagaatccagcagtctcaggacacaaggc ctgttactagcactcacatggaacaaatggcctctctagaat 3'

SEQ ID NO: 15 = SEQ ID NO: 1 + SEQ ID NO: 7
5' aatcaacctctggattacaaaatttgtgaaagattgactggtattcttaactatgtt gctccttttacgctatgtggatacgctgctttaatgccttttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttccgggactttcgctttcccctc cctattgccacggcggaactcatcgccgcctgccttgcccgctgctggacagggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctgcgcgctcgctcgctcactgaggccgggcgaccaaaggtcgcccgac gcccgggctttgccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctcccttagggttccgatttagtgc tttacggcacctcgaccccaaaaaacttgattagggtgatggttcacgtagtgggccatc gccctgatagacggttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaattttttatccttgc gttgaaataaaggcttctcccgcaaaagtattacagggtcataatgttttggtacaacc gatttagctttatgctctgaggctttattgcttaattttgctaattcttttgccttgcctg tatgatttattggatgttggaattcctgatgcggtattttctccttacgcatctgtgcgg -continued

```
tatttcacaccgcatatggtgcactctcagtacaatctgctctgatgccgcatagttaag
ccagccccgacacccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctattttttataggttaa
tgtcatgataataatggtttcttagacgtcaggtggcacttttcggggaaatgtgcgcgg
aaccccctatttgtttatttttctaaatacattcaaatatgtatccgctcatgagacaata
accctgataaatgcttcaataatattgaaaaaggaagagtatgagtattcaacatttccg
tgtcgcccttattccctttttttgcggcattttgccttcctgtttttgctcacccagaaac
gctggtgaaagtaaaagatgctgaagatcagttgggtgcacgagtgggttacatcgaact
ggatctcaacagcggtaagatccttgagagttttcgccccgaagaacgttttccaatgat
gagcacttttaaagttctgctatgtggcgcggtattatcccgtattgacgccgggcaaga
gcaactcggtcgccgcatacactattctcagaatgacttggttgagtactcaccagtcac
agaaaagcatcttacggatggcatgacagtaagagaattatgcagtgctgccataaccat
gagtgataacactgcggccaacttacttctgacaacgatcggaggaccgaaggagctaac
cgcttttttgcacaacatgggggatcatgtaactcgccttgatcgttgggaaccggagct
gaatgaagccataccaaacgacgagcgtgacaccacgatgcctgtagcaatggcaacaac
gttgcgcaaactattaactggcgaactacttactctagcttcccggcaacaattaataga
ctggatggaggcggataaagttgcaggaccacttctgcgctcggcccttccggctggctg
gtttattgctgataaatctggagccggtgagcgtgggtctcgcggtatcattgcagcact
ggggccagatggtaagccctcccgtatcgtagttatctacacgacggggagtcaggcaac
tatggatgaacgaaatagacagatcgctgagataggtgcctcactgattaagcattggta
actgtcagaccaagtttactcatatactttagattgatttaaaacttcatttttaatt
taaaaggatctaggtgaagatcctttttgataatctcatgaccaaaatcccttaacgtga
gttttcgttccactgagcgtcagaccccgtagaaaagatcaaaggatcttcttgagatcc
tttttttctgcgcgtaatctgctgcttgcaaacaaaaaaaccaccgctaccagcggtggt
ttgtttgccggatcaagagctaccaactctttttccgaaggtaactggcttcagcagagc
gcagataccaaatactgtccttctagtgtagccgtagttaggccaccacttcaagaactc
tgtagcaccgcctacatacctcgctctgctaatcctgttaccagtggctgctgccagtgg
cgataagtcgtgtcttaccgggttggactcaagacgatagttaccggataaggcgcagcg
gtcgggctgaacggggggttcgtgcacacagcccagcttggagcgaacgacctacaccga
actgagatacctacagcgtgagctatgagaaagcgccacgcttcccgaagggagaaaggc
ggacaggtatccggtaagcggcagggtcggaacaggagagcgcacgagggagcttccagg
gggaaacgcctggtatctttatagtcctgtcgggtttcgccacctctgacttgagcgtcg
atttttgtgatgctcgtcaggggggcggagcctatggaaaaacgccagcaacgcggcctt
tttacggttcctggccttttgctggccttttgctcacatgttctttcctgcgttatcccc
tgattctgtggataaccgtattaccgcctttgagtgagctgataccgctcgccgcagccg
aacgaccgagcgcagcgagtcagtgagcgaggaagcggaagagcgcccaatacgcaaacc
gcctctccccgcgcgttggccgattcattaatgcagcagctgcgcgctcgctcgctcact
gaggcgcccgggcaaagcccgggcgtcgggcgacctttggtcgcccggcctcagtgagc
gagcgagcgcgcagagagggagtggccaactccatcactaggggttccttgtagttaatg
```

-continued

```
attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctcccatctccccc cctccccacccccaattttgtatttatttattttttaattattttgtgcagcgatggggg cggggggggggggggcgcgcgccaggcggggcggggcggggcgaggggcggggcgggc gaggcggagaggtgcggcggcagccaatcagagcggcgcgctccgaaagtttccttttat ggcgaggcggcggcggcggcccctataaaaagcgaagcgcgcggcgggcgggagtcgc tgcgcgctgccttcgcccgtgccccgctccgccgccgcctcgcgccgcccgccccggct ctgactgaccgcgttactaaaacaggtaagtccggcctccgcgccgggttttggcgcctc ccgcgggcgccccctcctcacggcgagcgctgccacgtcagacgaagggcgcagcgagc gtcctgatccttccgcccggacgctcaggacagcgggccgctgctcataagactcggcct tagaaccccagtatcagcagaaggacattttaggacgggacttgggtgactctagggcac tggttttctttccagagagcggaacaggcgaggaaaagtagtcccttctcggcgattctg cggagggatctccgtggggcggtgaacgccgatgatgcctctactaaccatgttcatgtt ttcttttttttttctacaggtcctgggtgacgaacagggtaccgccaccatggccaccggc tctcgcacaagcctgctgctggctttcggactgctgtgcctgccttggctccaggagggc tccgccgctagcatcgataccgtcgctatgtgctggaggcttgctgaaggctgtatgctg attagcactggtgatttccggctgttttggcctctgactgacgaccggaaatccagtgct aatcaggacacaaggcctgttactagcactcacatggaacaaatggcctctagcctggag gcttgctgaaggctgtatgctgattgagtttcgcattcttgttgccgttttggcctctga ctgacggcaacaagagcgaaactcaacaggacacaaggcctgttactagcactcacatgg aacaaatggcctctagcctggaggcttgctgaaggctgtatgctgattgatcaggcaaac atagtcccgttttggcctctgactgacgggactatgtgcctgatcaatcaggacacaagg cctgttactagcactcacatggaacaaatggcctctctagaat 3'
```

SEQ ID NO: 16 = SEQ ID NO: 1 + SEQ ID NO: 8

```
5' aatcaacctctggattacaaaatttgtgaaagattgactggtattcttaactatgtt gctccttttacgctatgtggatacgctgctttaatgcctttgtatcatgctattgcttcc cgtatgctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttccgggactttcgctttccccctc cctattgccacggcggaactcatcgccgcctgccttgcccgctgctggacagggctcgg ctgttgggcactgacaattccgtggtgttgtcggggaaatcatcgtccttcccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcattttttttcactgcattctagttgtggtttgtc
```

-continued

```
caaactcatcaatgtatcttatcatgtctggatctcgacctcgactagagcatggctacg tagataagtagcatggcgggttaatcattaactacaaggaaccectagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatcccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgcttcttcccttcctttctcgccacgtt cgccggctttccccgtcaagctctaaatcgggggctccctttagggttccgatttagtgc tttacggcacctcgaccccaaaaaacttgattagggtgatggttcacgtagtgggccatc gccctgatagacggttttcgcccttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatgagggttctaaaaattttttatccttgc gttgaaataaaggcttctcccgcaaaagtattacagggtcataatgttttggtacaacc gatttagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aaccccctatttgttttatttttctaaatacattcaaatatgtatccgctcatgagacaata accctgataaatgcttcaataatattgaaaaaggaagagtatgagtattcaacatttccg tgtcgcccttattccctttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct
```

```
gaatgaagccataccaaacgacgagcgtgacaccacgatgcctgtagcaatggcaacaac
gttgcgcaaactattaactggcgaactacttactctagcttcccggcaacaattaataga
ctggatggaggcggataaagttgcaggaccacttctgcgctcggcccttccggctggctg
gtttattgctgataaatctggagccggtgagcgtgggtctcgcggtatcattgcagcact
ggggccagatggtaagccctcccgtatcgtagttatctacacgacggggagtcaggcaac
tatggatgaacgaaatagacagatcgctgagataggtgcctcactgattaagcattggta
actgtcagaccaagtttactcatatatactttagattgatttaaaacttcatttttaatt
taaaaggatctaggtgaagatcctttttgataatctcatgaccaaaatcccttaacgtga
gttttcgttccactgagcgtcagaccccgtagaaaagatcaaaggatcttcttgagatcc
tttttttctgcgcgtaatctgctgcttgcaaacaaaaaaaccaccgctaccagcggtggt
ttgtttgccggatcaagagctaccaactctttttccgaaggtaactggcttcagcagagc
gcagataccaaatactgtccttctagtgtagccgtagttaggccaccacttcaagaactc
tgtagcaccgcctacatacctcgctctgctaatcctgttaccagtggctgctgccagtgg
cgataagtcgtgtcttaccgggttggactcaagacgatagttaccggataaggcgcagcg
gtcgggctgaacggggggttcgtgcacacagcccagcttggagcgaacgacctacaccga
actgagatacctacagcgtgagctatgagaaagcgccacgcttcccgaagggagaaaggc
ggacaggtatccggtaagcggcagggtcggaacaggagagcgcacgagggagcttccagg
gggaaacgcctggtatctttatagtcctgtcgggtttcgccacctctgacttgagcgtcg
atttttgtgatgctcgtcaggggggcggagcctatggaaaaacgccagcaacgcggcctt
tttacggttcctggccttttgctggccttttgctcacatgttctttcctgcgttatcccc
tgattctgtggataaccgtattaccgcctttgagtgagctgataccgctcgccgcagccg
aacgaccgagcgcagcgagtcagtgagcgaggaagcggaagagcgcccaatacgcaaacc
gcctctccccgcgcgttggccgattcattaatgcagcagctgcgcgctcgctcgctcact
gaggccgcccgggcaaagcccgggcgtcgggcgaccttggtcgcccggcctcagtgagc
gagcgagcgcgcagagagggagtggccaactccatcactaggggttccttgtagttaatg
attaacccgccatgctacttatctacgtagccatgctctaggacattgattattgactag
tggagttccgcgttacataacttacggtaaatggcccgcctggctgaccgcccaacgacc
cccgcccattgacgtcaataatgacgtatgttcccatagtaacgccaatagggactttcc
attgacgtcaatgggtggagtatttacggtaaactgcccacttggcagtacatcaagtgt
atcatatgccaagtacgccccctattgacgtcaatgacggtaaatggcccgcctggcatt
atgcccagtacatgaccttatgggactttcctacttggcagtacatctacgtattagtca
tcgctattaccatggtcgaggtgagccccacgttctgcttcactctccccatctccccc
cctccccaccccaattttgtatttatttattttttaattattttgtgcagcgatggggg
cggggggggggggcgcgcgccaggcggggcggggcggggcgaggggcggggcgggc
gaggcggagaggtgcggcggcagccaatcagagcggcgcgctccgaaagtttccttttat
ggcgaggcggcggcggcggcggccctataaaaagcgaagcgcgcggcgggcgggagtcgc
tgcgcgctgccttcgccccgtgccccgctccgccgccgcctcgccgcccgccccggct
ctgactgaccgcgttactaaaacaggtaagtccggcctccgcgccgggttttggcgcctc
ccgcgggcgcccccctcctcacggcgagcgctgccacgtcagacgaagggcgcagcgagc
gtcctgatccttccgcccggacgctcaggacagcggcccgctgctcataagactcggcct
```

-continued tagaacccagtatcagcagaaggacattttaggacgggacttgggtgactctagggcac tggttttctttccagagagcggaacaggcgaggaaaagtagtcccttctcggcgattctg cggagggatctccgtggggcggtgaacgccgatgatgcctctactaaccatgttcatgtt ttctttttttttctacaggtcctgggtgacgaacagggtaccgccaccatggccaccggc tctcgcacaagcctgctgctggctttcggactgctgtgcctgccttggctccaggagggc tccgccgctagcatcgataccgtcgctatgtgctggaggcttgctgaaggctgtatgctg tctgatcgtggtgttatttgggcgttttggcctctgactgacgcccaataaccacgatc agacaggacacaaggcctgttactagcactcacatggaacaaatggcctctagcctggag gcttgctgaaggctgtatgctgttgagtttcgcattcttgttgccgttttggcctctgac tgacggcaacaagagcgaaactcaacaggacacaaggcctgttactagcactcacatgga acaaatggcctctagcctggaggcttgctgaaggctgtatgctgtatcctcttataactc agcctccgttttggcctctgactgacggaggctgagataagaggatacaggacacaaggc ctgttactagcactcacatggaacaaatggcctctctagaat 3'

SEQ ID NO: 17 = SEQ ID NO: 1 + SEQ ID NO: 9
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttttcgggactttcgctttcccctc cctattgccacggcggaactcatcgccgcctgccttgcccgctgctggacagggctcgg ctgtgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgcctcagacgagtcggatctcccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactctttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctcccctttagggttccgatttagtgc tttacggcacctcgaccccaaaaaacttgattagggtgatggttcacgtagtgggccatc gccctgatagacggtttttcgccctttgacgttggagtccacgttctttaatagtggact -continued

```
cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttggggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaattttatccttgc gttgaaataaaggcttctcccgcaaaagtattacagggtcataatgttttggtacaacc gattagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctattttataggttaa tgtcatgataataatggtttcttagacgtcaggtggcacttttcggggaaatgtgcgcgg aaccctatttgtttattttctaaatacattcaaatatgtatccgctcatgagacaata accctgataaatgcttcaataatattgaaaaaggaagagtatgagtattcaacatttccg tgtcgcccttattccctttttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcattttaatt taaaaggatctaggtgaagatcctttttgataatctcatgaccaaaatcccttaacgtga gttttcgttccactgagcgtcagacccgtagaaaagatcaaaggatcttcttgagatcc ttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga
```

-continued

```
actgagatacctacagcgtgagctatgagaaagcgccacgcttcccgaagggagaaaggc
ggacaggtatccggtaagcggcagggtcggaacaggagagcgcacgagggagcttccagg
gggaaacgcctggtatctttatagtcctgtcgggtttcgccacctctgacttgagcgtcg
attttgtgatgctcgtcagggggcggagcctatggaaaaacgccagcaacgcggcctt
tttacggttcctggccttttgctggccttttgctcacatgttctttcctgcgttatcccc
tgattctgtggataaccgtattaccgcctttgagtgagctgataccgctcgccgcagccg
aacgaccgagcgcagcgagtcagtgagcgaggaagcggaagagcgcccaatacgcaaacc
gcctctccccgcgcgttggccgattcattaatgcagcagctgcgcgctcgctcgctcact
gaggccgcccgggcaaagcccgggcgtcgggcgacctttggtcgcccggcctcagtgagc
gagcgagcgcgcagagagggagtggccaactccatcactaggggttccttgtagttaatg
attaacccgccatgctacttatctacgtagccatgctctaggacattgattattgactag
tggagttccgcgttacataacttacggtaaatggcccgcctggctgaccgcccaacgacc
cccgcccattgacgtcaataatgacgtatgttcccatagtaacgccaatagggactttcc
attgacgtcaatgggtggagtatttacggtaaactgcccacttggcagtacatcaagtgt
atcatatgccaagtacgccccctattgacgtcaatgacggtaaatggcccgcctggcatt
atgcccagtacatgaccttatgggactttcctacttggcagtacatctacgtattagtca
tcgctattaccatggtcgaggtgagccccacgttctgcttcactctccccatctccccc
cctccccacccccaattttgtatttatttattttttaattattttgtgcagcgatggggg
cgggggggggggggcgcgcgccaggcggggcggggcggggcgaggggcggggcgggc
gaggcggagaggtgcggcggcagccaatcagagcggcgcgctccgaaagtttccttttat
ggcgaggcggcggcggcggcggccctataaaaagcgaagcgcgcggcgggcgggagtcgc
tgcgcgctgccttcgccccgtgccccgctccgccgccgcctcgccgcgcccgccccggct
ctgactgaccgcgttactaaaacaggtaagtccggcctccgcgccgggttttggcgcctc
ccgcgggcgccccctcctcacggcgagcgctgccacgtcagacgaagggcgcagcgagc
gtcctgatccttccgcccggacgctcaggacagcggcccgctgctcataagactcggcct
tagaaccccagtatcagcagaaggacattttaggacgggacttgggtgactctagggcac
tggttttctttccagagagcggaacaggcgaggaaaagtagtcccttctcggcgattctg
cggagggatctccgtggggcggtgaacgccgatgatgcctctactaaccatgttcatgtt
ttcttttttttttctacaggtcctgggtgacgaacagggtaccgccaccatggccaccggc
tctcgcacaagcctgctgctggctttcggactgctgtgcctgccttggctccaggagggc
tccgccgctagcatcgataccgtcgctatgtgctggaggcttgctgaaggctgtatgctg
tcgtactgacttgtaggtatgccgttttggcctctgactgacggcatacctaagtcagta
cgtcaggacacaaggcctgttactagcactcacatggaacaaatggcctctagcctggag
gcttgctgaaggctgtatgctgactcctaatcaatagcttccaccgttttggcctctgac
tgacggtggaagcttgattaggagtcaggacacaaggcctgttactagcactcacatgga
acaaatggcctctagcctggaggcttgctgaaggctgtatgctgaatatgcctttaagct
ttgctgcgttttggcctctgactgacgcagcaaagcaaaggcatattcaggacacaaggc
ctgttactagcactcacatggaacaaatggcctctctagaat 3'
```

As will be appreciated by those skilled in the art, because the recombinant plasmid is a circular vector, the one or more sequences of the miRNA expression cassettes may be connected at the 3' end of SEQ ID NO. 1, as shown in SEQ ID NO. 10-17 or at the 5' end of SEQ ID NO. 1.

As will be appreciated by those skilled in the art, a perfect match of nucleotides with each of the miRNA expression cassette sequences is not necessary in order to have the desired result of decreased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the miRNA expression cassettes causes the desired result. In some embodiments of the present disclosure, about 85% to about 100% nucleotide sequence matching with each of the miRNA expression cassettes causes the desired result. In some embodiments of the present disclosure, about 90% to about 100% nucleotide sequence matching with each of the miRNA expression cassettes causes the desired result. In some embodiments of the present disclosure, about 95% to about 100% nucleotide sequence matching with each of the miRNA expression cassettes causes the desired result.

Example 1—Expression Cassette

Expression cassettes for expressing miRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes Kpn and XbaI in the MCS and separated on a 1% agarose gel. The band of interest was excised and purified using a gel extraction kit. Each miRNA expression cassette was amplified by polymerase chain reaction (PCR) using Taq polymerase and the PCR products were gel purified and the bands on interest were also excised and purified using a gel extraction kit. These PCR products contained the miRNA expression cassettes in addition to 15 base pair 5' and 3' overhangs that aligned with the ends of the linearized pAVA-00200 backbone. Using in-fusion cloning, the amplified miRNA expression cassettes are integrated with the pAVA-00200 backbone via homologous recombination. The resulting RP contained the following: 5' ITR. CASI promoter. miRNA expression cassette. WPRE. SV40 polyA and ITR 3'.

The invention claimed is:

1. A composition that comprises a recombinant plasmid (RP) comprising a sequence of nucleotides that is SEQ ID NO: 3.

2. The composition of claim 1, wherein the RP is encased in a protein coat, a lipid vesicle, or any combination thereof.

3. A composition that comprises a recombinant plasmid (RP) comprising a sequence of nucleotides that is SEQ ID NO: 11.

* * * * *

SEQUENCE LISTING

```
Sequence total quantity: 17
SEQ ID NO: 1            moltype = DNA  length = 5883
FEATURE                 Location/Qualifiers
source                  1..5883
                        mol_type = other DNA
                        organism = synthetic construct
SEQUENCE: 1
aatcaacctc tggattacaa aatttgtgaa agattgactg gtattcttaa ctatgttgct  60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aacccccact  240
ggttggggca ttgccaccac ctgtcagctc ctttccggga ctttcgcttt cccctcct   300
attgccacgg cggaactcat cgccgcctgc cttgcccgct gctggacagg ggctcggctg  360
ttgggcactg acaattccgt ggtgttgtcg gggaaatcat cgtccttcc ttggctgctc  420
gcctgtgttg ccacctggat tctgcgcggg acgtccttct gctacgtccc ttcggccctc  480
aatccagcgg accttccttc ccgcggcctg ctgccggctc tgcggcctct tccgcgtctt  540
cgccttcgcc ctcagacgag tcggatctcc ctttgggccg cctccccgcc taagcttaat  600
gataccgtcg agatctaact tgtttattgc agcttataat ggttacaaat aaagcaatag  660
catcacaaat ttcacaaata aagcattttt ttcactgcat tctagttgtg gtttgtccaa  720
actcatcaat gtatcttatc atgtctggat ctcgacctcg actagagcat ggctacgtag  780
ataagtagca tggcgggtta atcattaact acaaggaacc cctagtgatg gagttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc  1020
gttgcaatgg ctggcggtaa tattgttctg gatattacca gcaaggccga tagtttgagt  1080
tcttctactc aggcaagtga tgttattact aatcaaagaa gtattgcgac aacggttaat  1140
ttgcgtgatg gacagactct tttactcggt ggcctcactg attataaaaa cacttctcag  1200
gattctggcg taccgttcct gtctaaaatc cctttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg cgcagcgtga ccgctacact  1380
tgccagcgcc ctagcgcccg ctcctttcgc tttcttccct tcctttctcg ccacgttcgc  1440
cggctttccc cgtcaagctc taaatcgggg ctcccttta gggttccgat ttagtgcttt  1500
acggcacctc gaccccaaaa aacttgatta gggtgatggt tcacgtagtg ggccatcgcc  1560
ctgatagacg gtttttcgcc ctttgacgtt ggagtccacg ttctttaata gtggactctt  1620
gttccaaact ggaacaacac tcaacctat ctcggtctat tcttttgatt tataagggat  1680
tttgccgatt tcggcctatt ggttaaaaaa tgagctgatt taacaaaaat ttaacgcgaa  1740
ttttaacaaa atattaacgt ttacaattta aatatttgct tatacaatct tcctgttttt  1800
ggggcttttc tgattatcaa ccgggggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc ctttctcacc cgtttgaatc tttacctaca  2040
cattactcag gcattgcatt taaaatatat gagggttcta aaaattttta tccttgcgtt  2100
gaaataaagg cttctcccgc aaaagtatta cagggtcata atgttttttgg tacaaccgat  2160
ttagctttat gctctgaggc tttattgctt aattttgcta attcttttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgctgacgc gccctgacgg gcttgtctgc tcccggcatc  2400
```

```
cgcttacaga caagctgtga ccgtctccgg gagctgcatg tgtcagaggt tttcaccgtc      2460
atcaccgaaa cgcgcgagac gaaagggcct cgtgatacgc ctattttat aggttaatgt       2520
catgataata atggtttctt agacgtcagg tggcacttt cggggaaatg tgcgcggaac       2580
ccctatttgt ttatttttct aaatacattc aaatatgtat ccgctcatga gacaataacc     2640
ctgataaatg cttcaataat attgaaaaag gaagagtatg agtattcaac atttccgtgt     2700
cgcccttatt ccctttttg cggcattttg ccttcctgtt tttgctcacc cagaaacgct     2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acgatggca tgacagtaag agaattatgc agtgctgcca taaccatgag    3060
tgataacact gcggccaact tacttctgac aacgatcgga ggaccgaagg agctaaccgc    3120
ttttttgcac aacatggggg atcatgtaac tcgccttgat cgttgggaac cggagctgaa    3180
tgaagccata ccaaacgacg agcgtgacac cacgatgcct gtagcaatgg caacaacgtt    3240
gcgcaaacta ttaactggcg aactacttac tctagcttcc cggcaacaat taatagactg    3300
gatggaggcg gataaagttg caggaccact tctgcgctcg gcccttccgg ctggctggtt    3360
tattgctgat aaatctggag ccggtgagcg tgggtctcgc ggtatcattg cagcactggg    3420
gccagatggt aagccctccc gtatcgtagt tatctacacg acggggagtc aggcaactat    3480
ggatgaacga aatagacaga tcgctgagat aggtgcctca ctgattaagc attggtaact    3540
gtcagaccaa gtttactcat atatacttta gattgattta aaacttcatt tttaatttaa    3600
aaggatctag gtgaagatcc ttttgataa tctcatgacc aaaatccctt aacgtgagtt    3660
ttcgttccac tgagcgtcag accccgtaga aaagatcaaa ggatcttctt gagatcctt    3720
ttttctgcgc gtaatctgct gcttgcaaac aaaaaaacca ccgctaccag cggtggtttg    3780
tttgccggat caagagctac caactctttt tccgaaggta actggcttca gcagagcgca    3840
gataccaaat actgtcctc tagtgtagcc gtagttaggc caccacttca agaactctgt     3900
agcaccgcct acatacctcg ctctgctaat cctgttaaca gtggctgctg ccagtggcga    3960
taagtcgtgt cttaccgggt tggactcaag acgatagtta ccggataagg cgcagcggtc    4020
gggctgaacg gggggttcgt gcacacagcc cagcttggag cgaacgacct acaccgaact    4080
gagatacctac cagcgtgagc tatgagaaag cgccacgctt cccgaaggga gaaaggcgga    4140
caggtatccg gtaagcggca gggtcggaac aggagagcgc acgagggagc ttccagggg    4200
aaacgcctgg tatctttata gtcctgtcgg gtttcgccac ctctgacttg agcgtcgatt    4260
tttgtgatgc tcgtcagggg gcggagcct atggaaaaac gccagcaacg cggcctttt    4320
acggttcctg gccttttgct ggccttttgc tcacatgttc tttcctgcgt tatccctga    4380
ttctgtggat aaccgtatta ccgcctttga gtgagctgat accgctcgcc gcagccgaac    4440
gaccgagcgc agcgagtcag tgagcgagga agcggaagag cgcccaatac gcaaaccgcc    4500
tctccccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagagggagt ggccaactcc atcactaggg gttccttgta gttaatgatt    4680
aacccgccat gctacttatc tacgtagcca tgctctagga cattgattat tgactagtga    4740
agttccgcgt tacataactt acggtaaatg gcccgcctgg ctgaccgccc aacgaccccc    4800
gcccattgac gtcaataatg acgtatgttc ccatagtaac gccaataggg actttccatt    4860
gacgtcaatg ggtggagtat ttacggtaaa ctgcccactt ggcagtacat caagtgtatc    4920
atatgccaag tacgccccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctcccccatc tcccccccct    5100
cccccacccc aattttgtat ttatttatt tttaattatt ttgtgcagcg atgggggcgg     5160
ggggggggg gggcgcgcgc caggcgggc ggggcgggg gaggggcggg gcggggcgag       5220
gcggagaggt gcggcggcag ccaatcagag cggcgcgctc cgaaagtttc cttttatggc    5280
gaggcggcgc ggcggcggc cctataaaaa gcgaagcgcg cggcgggcgg gagtcgctgc    5340
gcgctgcctt cgccccgtgc cccgctccgc cgccgcctcg cgccgcccgc ccggctctg    5400
actgaccgcg ttactaaaac aggtaagtcc ggcctccggg cgggttttg cggcctcccg    5460
cgggcgcccc cctcctcacg cgagcgctg ccacgtcaga cgaagggcgc agcgagcgtc    5520
ctgatccttc cgcccggacg ctcaggacag cggcccgctg ctcataagac tcggccttag    5580
aaccccagta tcagcagaag gacattttag gacgggactt gggtgactct agggcactgg    5640
ttttctttcc agagagcgga acaggcgagg aaaagtagtc ccttctcggc gattctgcgg    5700
agggatctcc gtggggcggt gaacgccgat gatgcctcta ctaaccatgt tcatgttttc    5760
tttttttttc tacaggtcct gggtgacgaa cagggtaccg ccaccatggc caccggctct    5820
cgcacaagcc tgctgctggc tttcggactg ctgtgcctgc cttggctcca ggagggctcc    5880
gcc                                                                    5883

SEQ ID NO: 2         moltype = DNA   length = 456
FEATURE              Location/Qualifiers
source               1..456
                     mol_type = other DNA
                     organism = synthetic construct SEQUENCE: 2
gctagcatcg ataccgtcgc tatgtgctgg aggcttgctg aaggctgtat gctgtaaggt      60
ggttatggga gaatgccgtt ttggcctctg actgacggca ttctcctaca caccttacag     120
gacacaaggc ctgttactag cactcacatg gaacaaatga cctctaccct ggaggcttga     180
tgaaggctgt atgctgttga gtttcgcatt cttgttgccg ttttggcctc tgactgacgg     240
caacaagagc gaaactcaac aggacacaag gcctgttact agcactcaca tggaacaaat     300
ggcctctagc ctgaggcttg ctgaaggct gtatgctgtc tatcctttca agctagtcac     360
cgttttggcc tctgactgac ggtgactagc gaaaggatag acaggacaca aggcctgtta     420
ctagcactca catggaacaa atggcctctc tagaat                                456

SEQ ID NO: 3         moltype = DNA   length = 456
FEATURE              Location/Qualifiers
source               1..456
                     mol_type = other DNA
```

```
                          organism = synthetic construct
SEQUENCE: 3
gctagcatcg ataccgtcgc tatgtgctgg aggcttgctg aaggctgtat gctgaagtta    60
gcatgtgtcc cagaaccgtt ttggcctctg actgacggtt ctgggacatg ctaacttcag   120
gacacaaggc ctgttactag cactcacatg aacaaatggc cctctagcct ggaggcttgc   180
tgaaggctgt atgctgagaa gaaaggtatc ccaattgccg ttttggcctc tgactgacgg   240
caattgggac ctttcttctc aggacacaag gcctgttact agcactcaca tggaacaaat   300
ggcctctagc ctggaggctt gctgaaggct gtatgctgta gtgtttccaa atactgcttg   360
cgttttggcc tctgactgac gcaagcagta tggaaacact acaggacaca aggcctgtta   420
ctagcactca catggaacaa atggcctctc tagaat                             456

SEQ ID NO: 4              moltype = DNA   length = 456
FEATURE                   Location/Qualifiers
source                    1..456
                          mol_type = other DNA
                          organism = synthetic construct
SEQUENCE: 4
gctagcatcg ataccgtcgc tatgtgctgg aggcttgctg aaggctgtat gctgtctgac    60
agtgatgtca tcctttcgtt ttggcctctg actgacgaaa ggatgatcac tgtcagacag   120
gacacaaggc ctgttactag cactcacatg aacaaatggc cctctagcct ggaggcttgc   180
tgaaggctgt atgctgattt aggtcagatg gaaactcgcg ttttggcctc tgactgacgc   240
gagtttccct gacctaaatc aggacacaag gcctgttact agcactcaca tggaacaaat   300
ggcctctagc ctggaggctt gctgaaggct gtatgctgag tgtatgctta acgtggactt   360
cgttttggcc tctgactgac gaagtccacg aagcatacac tcaggacaca aggcctgtta   420
ctagcactca catggaacaa atggcctctc tagaat                             456

SEQ ID NO: 5              moltype = DNA   length = 456
FEATURE                   Location/Qualifiers
source                    1..456
                          mol_type = other DNA
                          organism = synthetic construct
SEQUENCE: 5
gctagcatcg ataccgtcgc tatgtgctgg aggcttgctg aaggctgtat gctgatactt    60
cagcctgaat cgtgaccgtt ttggcctctg actgacggtc acgattggct gaagtatcag   120
gacacaaggc ctgttactag cactcacatg aacaaatggc cctctagcct ggaggcttgc   180
tgaaggctgt atgctgactt cactcatatt gttccactcg ttttggcctc tgactgacga   240
gtggaacaat gagtgaagtc aggacacaag gcctgttact agcactcaca tggaacaaat   300
ggcctctagc ctggaggctt gctgaaggct gtatgctgta tattctacaa atcaccaggg   360
cgttttggcc tctgactgac gccctggtga tgtagaatat acaggacaca aggcctgtta   420
ctagcactca catggaacaa atggcctctc tagaat                             456

SEQ ID NO: 6              moltype = DNA   length = 456
FEATURE                   Location/Qualifiers
source                    1..456
                          mol_type = other DNA
                          organism = synthetic construct
SEQUENCE: 6
gctagcatcg ataccgtcgc tatgtgctgg aggcttgctg aaggctgtat gctgtataag    60
tccagtgaga agaaggcgtt ttggcctctg actgacgccc tcttctctgg acttatacag   120
gacacaaggc ctgttactag cactcacatg aacaaatggc cctctagcct ggaggcttgc   180
tgaaggctgt atgctgctat catcaaatga gctgctgcgt tttggcctct gactgacgca   240
gcagctcttg atgatagtca ggacacaagg cctgttacta gcactcacat ggaacaaatg   300
gcctctagcc tggaggcttg ctgaaggctg tatgctgaag actgctggaa attctatggc   360
tgttttggcc tctgactgac gaccatagaa tccagcagtc tcaggacaca aggcctgtta   420
ctagcactca catggaacaa atggcctctc tagaat                             456

SEQ ID NO: 7              moltype = DNA   length = 457
FEATURE                   Location/Qualifiers
source                    1..457
                          mol_type = other DNA
                          organism = synthetic construct
SEQUENCE: 7
gctagcatcg ataccgtcgc tatgtgctgg aggcttgctg aaggctgtat gctgattagc    60
actggtgatt tccggtgacc gttttggcct ctgactgacg gaaatccagt gctaatcagg   120
gacacaaggc ctgttactag cactcacatg aacaaatggc cctctagcct ggaggcttgc   180
tgaaggctgt atgctgattg agtttcgcat tcttgttgcc gttttggcct ctgactgacg   240
gcaacaagag cgaaactcaa caggacacaa ggcctgttac tagcactcac atggaacaaa   300
tggcctctag cctggaggct tgctgaaggc gtatgctga ttgatcaggc aaacatagtc   360
ccgttttggc ctctgactga cggggactatg tgcctgatca atcaggacac aaggcctgtt   420
actagcactc acatggaaca aatggcctct ctagaat                            457

SEQ ID NO: 8              moltype = DNA   length = 456
FEATURE                   Location/Qualifiers
source                    1..456
                          mol_type = other DNA
                          organism = synthetic construct
SEQUENCE: 8
gctagcatcg ataccgtcgc tatgtgctgg aggcttgctg aaggctgtat gctgtctgat    60
cgtggtgtta tttgggcgtt ttggcctctg actgacgccc aaataaccac gatcagacag   120
```

```
gacacaaggc ctgttactag cactcacatg gaacaaatgg cctctagcct ggaggcttgc    180
tgaaggctgt atgctgttga gtttcgcatt cttgttgccg ttttggcctc tgactgacgg    240
caacaagagc gaaactcaac aggacacaag gcctgttact agcactcaca tggaacaaat    300
ggcctctagc ctggaggctt gctgaaggct gtatgctgta tcctcttata actcagcctc    360
cgttttggcc tctgactgac ggaggctgag ataagaggat acaggacaca aggcctgtta    420
ctagcactca catggaacaa atggcctctc tagaat                              456

SEQ ID NO: 9            moltype = DNA   length = 456
FEATURE                 Location/Qualifiers
source                  1..456
                        mol_type = other DNA
                        organism = synthetic construct
SEQUENCE: 9
gctagcatcg ataccgtcgc tatgtgctgg aggcttgctg aaggctgtat gctgtcgtac     60
tgacttgtag gtatgccgtt ttggcctctg actgacggca tacctaagtc agtacgtcag    120
gacacaaggc ctgttactag cactcacatg gaacaaatgg cctctagcct ggaggcttgc    180
tgaaggctgt atgctgactc ctaatcaata gcttccaccg ttttggcctc tgactgacgg    240
tggaagcttg attaggagtc aggacacaag gcctgttact agcactcaca tggaacaaat    300
ggcctctagc ctggaggctt gctgaaggct gtatgctgaa tatgccttta agcttttgctg   360
cgttttggcc tctgactgac gcagcaaagc aaaggcatat tcaggacaca aggcctgtta    420
ctagcactca catggaacaa atggcctctc tagaat                              456

SEQ ID NO: 10           moltype = DNA   length = 6339
FEATURE                 Location/Qualifiers
source                  1..6339
                        mol_type = other DNA
                        organism = synthetic construct
SEQUENCE: 10
aatcaacctc tggattacaa aatttgtgaa agattgactg gtattcttaa ctatgttgct     60
ccttttacgc tatgtggata cgctgcttta atgcctttgt atcatgctat tgcttcccgt    120
atggctttca ttttctcctc cttgtataaa tcctggttgc tgtctctttt tgaggagttg    180
tggcccgttg tcaggcaacg tggcgtggtg tgcactgtgt ttgctgacgc aaccccccact   240
ggttgggggca ttgccaccac ctgtcagctc ctttccggga cttcgctttt ccccctcccc   300
attgccacgg cgaactcat cgccgcctgc cttgcccgct gctggacagg ggctcggctg    360
ttgggcactg acaattccgt ggtgttgtcg gggaaatcat cgtccttttcc ttggctgctc   420
gcctgtgttg ccacctggat tctgcgcggg acgtccttct gctacgtccc ttcggccctc    480
aatccagcgg accttccttc ccgcggcctg ctgccggctc tgcggcctct tccgcgtctt    540
cgccttcgcc ctcagacgag tcggatctcc ctttgggccg cctccccgcc taagcttatc    600
gataccgtcg agatctaact tgtttattgc agcttataat ggttacaaat aaagcaatag    660
catcacaaat ttcacaaata aagcattttt tcactgcat tctagttgtg gtttgtccaa    720
actcatcaat gtatcttatc atgtctggat ctcgacctcg actagagcat ggctacgtag    780
ataagtagca tggcgggtta atcattaact acaaggaacc cctagtgatg gagttggcca    840
ctccctctct gcgcgctcgc tcgctcactg aggccgggcg accaaaggtc gcccgacgcc    900
cgggctttgc ccgggcggcc tcagtgagcg agcgagcgcg cagctggcgt aatagcgaag    960
aggcccgcac cgatcgccct tcccaacagt tgcgcagcct gaatggcgaa tggcgattcc   1020
gttgcaatgg ctggcggtaa tattgttctg gatattacca gcaaggccga tagtttgagt   1080
tcttctactc aggcaagtga tgtttattact aatcaaagaa cttgcacgtt aat         1140
ttgcgtgatg gacagactct tttactcggt ggcctcactg attataaaaa cacttctcag   1200
gattctggcg taccgttcct gtctaaaatc cctttaatcg gcctcctgtt tagctcccgc   1260
tctgattcta acgaggaaag cacgttata cgtgctcgta aagcaaccat agtacgcgcc   1320
ctgtagcggc gcattaagcg cggcgggtgt ggtggttacg gcgcagcgtga ccgctacct   1380
tgccagcgcc ctagcgcccg ctccttttcgc tttcttccct tcctttctcg ccacgttcgc   1440
cggctttccc cgtcaagctc taaatcgggg gctcccttta gggttccgat ttagtgcttt   1500
acggcacctc gaccccaaaa aacttgatta gggtgatggt tcacgtagtg ggccatcgcc   1560
ctgatagacg gttttcgccc ctttgacgtt ggagtccacg ttctttaata gtggactctt   1620
gttccaaact ggaacaacac tcaacctat ctcggtctat tcttttgatt tataagggat    1680
tttgccgatt tcggcctatt ggttaaaaaa tgagctgatt taacaaaaat ttaacgcgaa    1740
ttttaacaaa atattaacgt ttacaattta aatatttgct tatacaatct tcctgttttt    1800
ggggcttttc tgattatcaa ccggggtaca tatgattgac atgctagttt tacgattacc    1860
gttcatcgat tctcttgttt gctccagact ctcaggcaat gacctgatag cctttgtaga    1920
gacctctcaa aaatagctac cctctccggc atgaatttat cagctagaac ggttgaatat    1980
catattgatg gtgatttgac tgtctccggc ctttctcacc cgtttgaatc tttacctaca    2040
cattactcag gcattgcatt taaaatatat gagggttcta aaaattttta tccttgcgtt    2100
gaaataaagg cttctcccgc aaaagtatta cagggtcata atgtttttgg tacaaccgat    2160
ttagctttat gctctgaggc tttattgctt aattttgcta attctttgcc ttgcctgtat    2220
gatttattgg atgttggaat tcctgatgcg gtattttctc cttacgcatc tgtgcggtat    2280
ttcacaccgc atatggtgca ctctcagtac aatctgctct gatgccgcat agttaagcca    2340
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctatttttat aggttaatgt    2520
catgataata atggtttctt agacgtcagg tggcactttt cggggaaatg tgcgcggaac    2580
ccctatttgt ttatttttct aaatacattc aaatatgtat ccgctcatga caataaccc    2640
ctgataaatg cttcaataat attgaaaaag gaagagtatg agtattcaac atttccgtgt    2700
cgcccttatt ccctttttg cggcattttg ccttcctgtt tttgctcacc cagaaacgct    2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acggatggca tgacagtaag agaattatgc agtgctgcca taaccatgag    3060
```

```
tgataacact gcggccaact tacttctgac aacgatcgga ggaccgaagg agctaaccgc   3120
tttttttgcac aacatggggg atcatgtaac tcgccttgat cgttgggaac cggagctgaa   3180
tgaagccata ccaaacgacg agcgtgacac cacgatgcct gtagcaatgg caacaacgtt   3240
gcgcaaacta ttaactggcg aactacttac tctagcttcc cggcaacaat taatagactg   3300
gatggaggcg gataaagttg caggaccact tctgcgctcg gcccttccgg ctggctggtt   3360
tattgctgat aaatctggag ccggtgagcg tgggtctcgc ggtatcattg cagcactggg   3420
gccagatggt aagccctccc gtatcgtagt tatctacacg acggggagtc aggcaactat   3480
ggatgaacga aatagacaga tcgctgagat aggtgcctca ctgattaagc attggtaact   3540
gtcagaccaa gtttactcat atatactttta gattgattta aaacttcatt tttaattaa   3600
aaggatctag gtgaagatcc ttttttgataa tctcatgacc aaaatccctt aacgtgagtt   3660
ttcgttccac tgagcgtcag acccccgtaga aaagatcaaa ggatcttctt gagatccttt   3720
ttttctgcgc gtaatctgct gcttgcaaac aaaaaaacca ccgctaccag cggtggtttg   3780
tttgccggat caagagctac caactctttt tccgaaggta actggcttca gcagagcgca   3840
gataccaaat actgtccttc tagtgtagcc gtagttaggc caccacttca agaactctgt   3900
agcaccgcct acatacctcg ctctgctaat cctgttacca gtggctgctg ccagtggcga   3960
taagtcgtgt cttaccgggt tggactcaag acgatagtta ccggataagg cgcagcggtc   4020
gggctgaacg ggggggttcgt gcacacagcc cagcttggag cgaacgacct acaccgaact   4080
gagataccta cagcgtgagc tatgagaaag cgccacgctt cccgaaggga gaaaggcgga   4140
caggtatccg gtaagcggca gggtcggaac aggagagcgc acgagggagc ttccaggggg   4200
aaaacgcctgg tatctttata gtcctgtcgg gtttcgccac ctctgacttg agcgtcgatt   4260
tttgtgatgc tcgtcagggg ggcggagcct atggaaaaac gccagcaacg cggcctttt   4320
acggttcctg gccttttgct ggccttttgc tcacatgttc tttcctgcgt tatccccctg   4380
ttctgtggat aaccgtatta ccgcctttga gtgagctgat accgctcgcc gcagccgaac   4440
gaccgagcgc agcgagtcag tgagcgagga agcggaagag cgcccaatac gcaaaccgcc   4500
tctccccgcg cgttggccga ttcattaatg cagcagctgc gcgctcgctc gctcactgag   4560
gccgcgggtc aaagcccgg gcgtcgggcg acctttgtc gcccggcctc agtgagcgag   4620
cgagcgcgca gagagggagt ggccaactcc atcactaggg gttccttgta gttaatgatt   4680
aacccgccat gctacttatc tacgtagcca tgctctagga cattgattat tgactagtgg   4740
agttccgcgt tacataactt acggtaaatg gcccgcctgg ctgaccgccc aacgacccc   4800
gcccattgac gtcaataatg acgtatgttc ccatagtaac gccaatatagg acttccatt   4860
gacgtcaatg ggtggagtat ttacggtaaa ctgcccactt ggcagtacat caagtgtatc   4920
atatgccaag tacgcccct attgacgtca atgacggtaa atggccccgcc tggcattatg   4980
cccagtacat gaccttatgg gactttccta cttggcagta catctacgta ttagtcatcg   5040
ctattaccat ggtcgaggtg agccccacgt tctgcttcac tctccccatc tccccccct   5100
ccccacccc aatttgtat ttatttattt tttaattatt ttgtgcagcg atggggggcgg   5160
ggggggggg gggcgcgcgc caggcggggc ggggcggggc gagggcggg gcggggcgag   5220
gcggagaggt gcggcggcag ccaatcagag cggcgcgctc cgaaagtttc cttttatggc   5280
gaggcggcgg cggcggcggc cctataaaaa gcgaagcgcg cggcgggcgg gagtcgctgc   5340
gcgctgcctt cgccccgtgc cccgctccgc cgccgccgc cccggctctg   5400
actgaccgcg ttactaaaac aggtaagtcc ggcctccgcg ccgggttttg gcgcctccg   5460
cgggcgcccc cctcctcacg gcgagcgctg ccacgtcaga cgaagggcgc agcgagcgtc   5520
ctgatccttc cgcccggacg ctcaggacag cggcccgctg ctcataagac tcggccttag   5580
aaccccagta tcagcagaag gacatttag gacgggactt gggtgactct agggcactgg   5640
ttttcttttcc agagagcgga acaggcgagg aaaagtagtc ccttctcggc gattctgcgg   5700
agggatctcc gtgggcggt gaacgccgat gatgcctcta ctaaccatgt tcatgttttc   5760
tttttttttc tacaggtcct gggtgacgaa cagggtaccg ccaccatggc caccggctct   5820
cgcacaagcc tgctgctggc tttcgactg ctgtgcctgc cttggctcca ggagggctcc   5880
gccgctagca tcgataccgt cgctatgtgc tggaggcttg ctgaaggctg tatgctgtaa   5940
ggtggttatg ggagaatgcc gttttggcct ctgactgacg gcattctcct aaccaccttta   6000
caggacacaa ggcctgttac tagcactcac atggaacaaa tggcctctag cctggaggct   6060
tgctgaaggc tgtatgctgt tgagtttcgc attcttgttg ccgttttgg ctctgactga   6120
cggcaacaag agcgaaactc aacaggacac aaggcctgtt actagcactc acatggaaca   6180
aatgccctct agcctggagg cttgctgaag gctgtatgct gtctatcctt tcaagctagt   6240
caccgttttg gcctctgact gacggtgact agcgaaagga tagacaggac acaaggcctg   6300
ttactagcac tcacatggaa caaatggcct ctctagaat                         6339

SEQ ID NO: 11         moltype = DNA   length = 6339
FEATURE               Location/Qualifiers
source                1..6339
                      mol_type = other DNA
                      organism = synthetic construct
SEQUENCE: 11
aatcaacctc tggattacaa aatttgtgaa agattgactg gtattcttaa ctatgttgct     60
ccttttacgc tatgtggata cgctgcttta atgcctttgt atcatgctat tgcttcccgt    120
atggctttca ttttctcctc cttgtataaa tcctggttgc tgtctcttta tgaggagttg    180
tggcccgttg tcaggcaacg tggcgtggtg tgcactgtgt ttgctgacgc aaccccccact    240
ggttgggca ttgccaccac ctgtcagctc ctttccggga ctttcgcttt ccccctcct    300
attgccacgg cggaactcat cgccgcctgc cttgcccgct gctggacagg ggctcggctg    360
ttgggcactg acaattccgt ggtgttgtcg gggaaatcat cgtccttttcc ttggctgctc    420
gcctgtgttg ccacctggat tctgcgcggg acgtccttct gctacgtccc ttcggccctc    480
aatccagcgg accttccttc ccgcggcctg ctgccggctc tgcggcctct tccgcgtctt    540
cgccttcgcc ctcagacgag tcggatctcc ctttgggccg cctccccgcc taagcttatc    600
gataccgtcg agatctaact tgtttattgc agcttataat ggttacaaat aaagcaatag    660
catcacaaat ttcacaaata aagcattttt ttcactgcat tctagttgtg gtttgtccaa    720
actcatcaat gtatcttatc atgtctggat ctcgacctcg actagagcat ggctacgtag    780
ataagtagca tggcgggtta atcattaact acaaggaacc cctagtgatg gagttggcca    840
ctccctctct gcgcgctcgc tcgctcactg aggccgggcg accaaaggtc gcccgacgcc    900
cgggctttgc ccgggcggcc tcagtgagcg agcgagcgcg cagctggcgt aatagcgaag    960
aggcccgcac cgatcgccct tcccaacagt tgcgcagcct gaatggcgaa tggcgattcc   1020
```

```
gttgcaatgg ctggcggtaa tattgttctg gatattacca gcaaggccga tagtttgagt    1080
tcttctactc aggcaagtga tgttattact aatcaaagaa gtattgcgac aacggttaat    1140
ttgcgtgatg gacagactct tttactcggt ggcctcactg attataaaaa cacttctcag    1200
gattctggcg taccgttcct gtctaaaatc cctttaatcg gcctcctgtt tagctcccgc    1260
tctgattcta acgaggaaag cacgttatac gtgctcgtca aagcaaccat agtacgcgcc    1320
ctgtagcggc gcattaagcg cggcgggtgt ggtggttacg cgcagcgtga ccgctacact    1380
tgccagcgcc ctagcgcccg ctcctttcgc tttcttccct tcctttctcg ccacgttcgc    1440
cggctttccc cgtcaagctc taaatcgggg ctcccttta gggttccgat ttagtgcttt    1500
acggcacctc gaccccaaaa aacttgatta gggtgatggt tcacgtagtg ggccatcgcc    1560
ctgatagacg gttttcgcc ctttgacgtt ggagtccacg ttctttaata gtggactctt    1620
gttccaaact ggaacaacac tcaaccctat ctccggtctat tcttttgatt tataagggat    1680
tttgccgatt tcggcctatt ggttaaaaaa tgagctgatt taacaaaaat ttaacgcgaa    1740
ttttaacaaa atattaacgt ttacaattta aatatttgct tatacaatct tcctgttttt    1800
ggggcttttc tgattatcaa ccggggtaca tatgattgac atgctagttt tacgattacc    1860
gttcatcgat tctcttgttt gctccagact ctcaggcaat gacctgatag cctttgtaga    1920
gacctctcaa aaatagctac cctctccggc atgaatttat cagctagaac ggttgaatat    1980
catattgatg gtgatttgac tgtctccggc ctttctcacc cgtttgaatc tttacctaca    2040
cattactcag gcattgcatt taaaatatat gagggttcta aaaattttta tccttgcgtt    2100
gaaataaagg cttctcccgc aaaagtatta caggtcata atgttttgg tacaaccgat    2160
ttagctttat gctctgaggc tttattgctt aattttgcta attctttgcc ttgcctgtat    2220
gatttattgg atgttggaat tcctgatgcg gtattttctc cttacgcatc tgtgcggtat    2280
ttcacaccgc atatggtgca ctctcagtac aatctgctct gatgccgcat agttaagcca    2340
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctatttttat aggttaatgt    2520
catgataata atggtttctt agacgtcagg tggcacttt cggggaaatg tgcgcggaac    2580
ccctatttgt ttatttttct aaatacattc aaatatgtat ccgctcatga gacaataacc    2640
ctgataaatg cttcaataat attgaaaaag gaagagtatg agtattcaac atttccgtgt    2700
cgcccttatt ccctttttg cggcattttg ccttcctgtt tttgctcacc cagaaacgct    2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acggatggca tgacagtaag agaattatgc agtgctgcca taaccatgag    3060
tgataacact gcggccaact tacttctgac aacgatcgga ggaccgaagg agctaaccgc    3120
ttttttgcac aacatggggg atcatgtaac tcgccttgat cgttgggaac cggagctgaa    3180
tgaagccata ccaaacgacg agcgtgacac cacgatgcct gtagcaatgg caacaacgtt    3240
gcgcaaacta ttaactggcg aactacttac tctagcttcc cggcaacaat taatagactg    3300
gatggaggcg gataaagttg caggaccact tctgcgctcg gcccttccgg ctggctgttt    3360
tattgctgat aaatctggag ccggtgagcg tgggtctcgc ggtatcattg cagcactggg    3420
gccagatggt aagccctccc gtatcgtagt tatctacacg acggggagtc aggcaactat    3480
ggatgaacga aatagacaga tcgctgagat aggtgcctca ctgattaagc attggtaact    3540
gtcagaccaa gtttactcat atatacttta gattgattta aaacttcatt tttaatttaa    3600
aaggatctag gtgaagatcc tttttgataa tctcatgacc aaaatccctt aacgtgagtt    3660
ttcgttccac tgagcgtcag accccgtaga aagatcaaa ggatcttctt gagatccttt    3720
ttttctgcgc gtaatctgct gcttgcaaac aaaaaaacca ccgctaccag cggtggtttg    3780
tttgccggat caagagctac caactctttt tccgaaggta actggcttca gcagagcgca    3840
gataccaaat actgtccttc tagtgtagcc gtagttaggc caccacttca agaactctgt    3900
agcaccgcct acatacctcg ctctgctaat cctgttacca gtggctgctg ccagtggcga    3960
taagtcgtgt cttaccgggt tggactcaag acgatagtta ccggataagg cgcagcggtc    4020
gggctgaacg gggggttcgt gcacacagcc cagcttggag cgaacgacct acaccgaact    4080
gagataccta cagcgtgagc tatgagaaag cgccacgctt cccgaaggga gaaaggcgga    4140
caggtatccg gtaagcggca gggtcggaac aggagagcgc acgagggagc ttccaggggg    4200
aaacgcctgg tatctttata gtcctgtcgg gtttcgccac ctctgacttg agcgtcgatt    4260
tttgtgatgc tcgtcagggg gcggagcct atggaaaaac gccagcaacg cggcctttt    4320
acggttcctg gccttttgct ggccttttgc tcacatgttc tttcctgcgt tatcccctga    4380
ttctgtggat aaccgtatta ccgcctttga gtgagctgat accgctcgcc gcagccgaac    4440
gaccgagcgc agcgagtcag tgagcgagga agcggaagag cgcccaatac gcaaaccgcc    4500
tctccccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagggagt ggccaactcc atcactaggg gttccttgta gttaatgatt    4680
aacccgccat gctacttatc tacgtagcca tgctctagga cattgattat tgactagtgg    4740
agttccgcgt tacataactt acggtaaatg gcccgcctgg ctgaccgccc aacgacccc    4800
gcccattgac gtcaataatg acgtatgttc ccatagtaac acgacatagggg acttccatt    4860
gacgtcaatg ggtggagtat ttacggtaaa ctgcccactt ggcagtacat caagtgtatc    4920
atatgccaag tacgccccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc tcccccccgg    5100
cccaccccc aattttgtat ttatttattt tttaattatt ttgtgcagcg atgggggcgg    5160
ggggggggggg gggcgcgcgc caggcggggc ggggcgggc gaggggcggg gcggggcgag    5220
gcggagaggt gcggcggcag ccaatcagag cggcgcgctc cgaaagtttc cttttatggc    5280
gaggcggcgg cggcggcggc cctataaaaa gcgaagcgcg cggcgggcgg gagtcgctgc    5340
gcgctgcctt cgccccgtgc cccgctccgc gccgcctcg gccgcccgc cccggctctg    5400
actgaccgcg ttactaaaac aggtaagtcc ggcctccggc ggcctcccc    5460
cgggcgcccc cctcctcacg gcgagcgctg ccacgtcaga cgaagggcgc agcgagcgtc    5520
ctgatcttc cgcccggacg ctcaggacag cggcccgctg ctcataagac tcggccttag    5580
aaccccagta tcagcagaag gacatttag gacgggactt gggtgactct agggcactgg    5640
ttttctttcc agagagcgga acaggcgagg aaaagtagtc ccttccggc gattctgcgg    5700
agggatctcc gtgggcggt gaacgccgat gatgcctcta ctaaccatgt tcatgttttc    5760
```

```
ttttttttttc tacaggtcct gggtgacgaa cagggtaccg ccaccatggc caccggctct   5820
cgcacaagcc tgctgctggc tttcggactg ctgtgcctgc cttggctcca ggagggctcc   5880
gccgctagca tcgataccgt cgctatgtgc tggaggcttg ctgaaggctg tatgctgaag   5940
ttagcatgtg tcccagaacc gttttggcct ctgactgacg gttctgggac atgctaactt   6000
caggacacaa ggcctgttac tagcactcac atggaacaaa tggcctctag cctgaaggct   6060
tgctgaaggc tgtatgctga aagaaaggt atcccaattg ccgttttggc ctctctgactga   6120
cggcaattgg gacctttctt ctcaggacac aaggcctgtt actagcactc acatggaaca   6180
aatggcctct agcctggagg cttgctgaag gctgtatgct gtagtgtttc caaatactgc   6240
ttgcgttttg gcctctgact gacgcaagca gtatggaaac actacaggac acaaggcctg   6300
ttactagcac tcacatggaa caaatggcct ctctagaat                          6339
```

SEQ ID NO: 12          moltype = DNA length = 6339
FEATURE              Location/Qualifiers
source               1..6339
                      mol_type = other DNA
                      organism = synthetic construct SEQUENCE: 12
```
aatcaacctc tggattacaa aatttgtgaa agattgactg gtattcttaa ctatgttgct   60
ccttttacgc tatgtggata cgctgcttta atgcctttgt atcatgctat tgcttcccgt   120
atggctttca ttttctcctc cttgtataaa tcctggttgc tgtctcttta tgaggagttg   180
tggcccgttg tcaggcaacg tggcgtggtg tgcactgtgt ttgctgacgc aaccccccact   240
ggttggggca ttgccaccac ctgtcagctc ctttccgttg ctttcgcttt cccctcccct   300
attgccacgg cggaactcat cgccgcctgc cttgcccgct gctggacagg ggctcggctg   360
tgggcactg acaattccgt ggtgttgtcg gggaaatcat cgtcctttcc ttggctgctc   420
gcctgtgttg ccacctggat tctgcgcggg acgtccttct gctacgtccc ttcggccctc   480
aatccagcgg accttccttc ccgcggcctg ctgccgctca ggccctct ccgcgtcttt   540
cgccttcgcc ctcagacgag tcggatctcc ctttgggccg cctccccgcc taagcttatc   600
gataccgtcg agatcaact tgtttattgc agcttataat ggttacaaat aaagcaatag   660
catcacaaat ttcacaaata aagcattttt tcactgcat tctagttgtg gtttgtccaa   720
actcatcaat gtatcttatc atgtctggat ctcgacctcg agatagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggccccgcac cgatcgccct tcccaacagt tgcgcagcctgaatggcgaa tggcgattcc   1020
gttgcaatgg ctggcggtaa tattgttctg gatattacca gcaaggccga tagttttgagt   1080
tcttctactc aggcaagtga tgttattact aatcaaagaa gtattgcgac aacgttaat   1140
ttgcgtgatg gacagactct tttactcggt ggcctcactg attataaaaa cacttctcag   1200
gattctggcg taccgttcct gtctaaaatc cctttaatcg gcctcctgtt tagctccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg ctcccctta gggttccgat ttagtgcttt   1500
acggcaccctc gaccccaaaa aacttgatta gggtgatggt tcacgtagtg ggccatcgcc   1560
ctgatagacg gttttcgcc ctttgacgtt ggagtccacg ttctttaata gtggactctt   1620
gttccaaact ggaacaacac tcaacctat ctcggtctat tcttttgatt tataagggat   1680
tttgccgatt tcggcctatt ggttaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaattat cagctagaac ggttgaatat   1980
catattgatg gtgatttgac tgtctccggc cttctcacc cgtttgaatc tttacctaca   2040
cattactcag gcattgcatt taaaatatat gagggttcta aaaatttta tccttgcgtt   2100
gaaataaagg cttctcccgc aaaagtatta cagggtcata atgtttttgg tacaaccgat   2160
ttagctttat gctctgaggc tttattgctt aattttgcta attctttgcc ttgcctgtat   2220
gatttattgg atgttggaat tcctgatgcg gtatttctc cttacgcatc tgtgcggtat   2280
ttcacaccgc atatggtgca ctctcagtac aatctgctct gatgccgcat agttaagcca   2340
gccccgacac ccgccaacac ccgctgacgc gccctgacgg gcttgtctgc tcccggcatc   2400
cgcttacaga caagctgtga ccgtctccgg gagctgcatg tgtcagaggt ttcaccgtc   2460
atcaccgaaa cgcgcgagac gaaagggcct cgtgatacgc ctattttat aggttaatgt   2520
catgataata atggtttctt agacgtcagg tggcactttt cggggaaatg tgcgcggaac   2580
ccctatttgt ttattttct aaatacattc aaatatgtat ccgctcatga cataatcc   2640
ctgataaatg cttcaataat attgaaaaag gaagagtatg agtattcaac atttccgtgt   2700
cgcccttatt cccttttttg cggcattttg ccttcctgtt tttgctcacc cagaaacgct   2760
ggtgaaagta aaagatgctg aagatcagtt gggtgcaga gtggttaca tcgaactgga   2820
tctcaacagc ggtaagatcc ttgagagtt tcgccccgaa gaacgtttc caatgatgag   2880
cactttaaa gttctgctat gtggcgcggt attatcccgt attgacgccg gcaagagca   2940
actcggtcgc cgcatacact attctcagaa tgacttggtt gagtactcac cagtcacaga   3000
aaagcatctt acggatggca tgacagtaag agaattatgc agtgctgcca taaccatgag   3060
tgataacact gcggccaact tacttctgac aacgatcgga ggaccgaagg agctaaccgc   3120
ttttttgcac aacatggggg atcatgtaac tcgccttgat cgttgggaac cggagctgaa   3180
tgaagccata ccaaacgacg agcgtgacac cacgatgcct gtagcaatgg caacaacgtt   3240
gcgcaaacta ttaactggcg aactacttac tctagcttcc cggcaacaat aatagactg   3300
gatggaggcg gataaagttg caggaccact tctgcgctcg gcccttccgg ctggctggtt   3360
tattgctgat aaatctggag ccggtgagcg tgggtctcgc ggtatcattg cagcactggg   3420
gccagatggt aagccctccc gtatcgtagt tatctacacg acgggggagtc aggcaactat   3480
ggatgaacga aatagacaga tcgctgagat aggtgcctca ctgattaagc attggtaact   3540
gtcagaccaa gtttactcat atatacttta gattgattta aaacttcatt ttaatttaa   3600
aaggatctag gtgaagatcc ttttgataa tctcatgacc aaaatccctt aacgtgagtt   3660
ttcgttccac tgagcgtcag accccgtaga aagatcaaa ggatcttctt gagatccttt   3720
```

```
ttttctgcgc gtaatctgct gcttgcaaac aaaaaaacca ccgctaccag cggtggtttg    3780
tttgccggat caagagctac caactctttt tccgaaggta actggcttca gcagagcgca    3840
gataccaaat actgtccttc tagtgtagcc gtagttaggc caccacttca agaactctgt    3900
agcaccgcct acatacctcg ctctgctaat cctgttacca gtggctgctg ccagtggcga    3960
taagtcgtgt cttaccgggt tggactcaag acgatagtta ccggataagg cgcagcggtc    4020
gggctgaacg gggggttcgt gcacacagcc cagcttggag cgaacgacct acaccgaact    4080
gagataccta cagcgtgagc tatgagaaag cgccacgctt cccgaaggga gaaaggcgga    4140
caggtatccg gtaagcggca gggtcggaac aggagagcgc acgagggagc ttccaggggg    4200
aaacgcctgg tatctttata gtcctgtcgg gtttcgccac ctctgacttg agcgtcgatt    4260
tttgtgatgc tcgtcagggg ggcggagcct atggaaaaac gccagcaacg cggccttttt    4320
acggttcctg gccttttgct ggcctttttgc tcacatgttc tttcctgcgt tatcccctga    4380
ttctgtggat aaccgtatta ccgcctttga gtgagctgat accgctcgcc gcagccgaac    4440
gaccgagcgc agcgagtcag tgagcgagga agcggaagag cgcccaatac gcaaaccgcc    4500
tctccccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagagggagt ggccaactcc atcactaggg gttccttgta gttaatgatt    4680
aacccgccat gctacttatc tacgtagcca tgctctagga cattgattat tgactagtgg    4740
agttccgcgt tacataactt acggtaaatg ccccgcctgg ctgaccgccc aacgaccccc    4800
gcccattgac gtcaataatg acgtatgttc ccatagtaac gccaatagg actttccatt    4860
gacgtcaatg ggtggagtat ttacggtaaa ctgcccactt ggcagtacat caagtgtatc    4920
atatgccaag tacgccccct attgacgtca atgacgtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc tccccccct    5100
cccaccccc aattttgtat ttatttattt tttaattatt ttgtgcagcg atggggcgg    5160
gggggggggg gggcgcgcgc caggcggggc ggggcgggc gaggggcggg gcggggcgag    5220
gcggagaggt gcggcggcag ccaatcagag cggcgcgctc cgaaagtttc cttttatgcg    5280
gaggcggcgg cggcggcgc cctataaaaa gcgaagcgcg cggcgggcgg gagtcgctgc    5340
gcgctgcctt cgccccgtgc cccgctccgc cgccgcctcg cgccgcccgc ccggctctg    5400
actgaccgcg ttactaaaac aggtaagtcc ggcctccgcg ccgggttttg gcgcctcccg    5460
cgggcgccc cctcctcacg gcgagcgctg ccacgtcaga cgaagggcgc agcgagcgtc    5520
ctgatcccttc cgcccggacg ctcaggacag cggcccgctg ctcataagac tcggccttag    5580
aaccccagta tcagcagaag gacattttag gacgggactt gggtgactct agggcactgg    5640
ttttctttcc agagagcgga acaggcgagg aaaagtagtc ccttctcggc gattctgcgg    5700
agggatctcc gtggggcggt gaacgccgat gatgcctcta ctaaccatgt tcatgttttc    5760
tttttttttc tacaggtcct gggtgacgaa caggtgaccg ccaccatgga caccggctct    5820
cgcacaagcc tgctgctggc tttcggactc tgtgcctgc cttggctcca ggagggctcc    5880
gccgctagca tcgataccgt cgctatgtgc tggaggcttg ctgaaggctg tatgctgtct    5940
gacagtgatg tcatcctttc gttttggcct ctgactacg aaaggatgat cactgtcaga    6000
caggacacaa ggcctgttac tagcactcac atggaacaaa tggcctctag cctggaggct    6060
tgctgaaggc tgtatgctga ttaggtcag atggaaactc gcgttttggc ctctgactga    6120
cgcgagtttc cctgacctaa atcaggacac aaggcctgtt actagcactc acatggaaca    6180
aatgccctc agcctggagg cttgctgaag gctgtatgct gagtgtatgc ttaacgtgga    6240
cttcgtttg gcctctgact gacgaagtcc acgaagcata cactcaggac acaaggcctg    6300
ttactagcac tcacatggaa caaatggcct ctctagaat                          6339

SEQ ID NO: 13        moltype = DNA   length = 6339
FEATURE              Location/Qualifiers
source               1..6339
                     mol_type = other DNA
                     organism = synthetic construct
SEQUENCE: 13
aatcaacctc tggattacaa aatttgtgaa agattgactg gtattcttaa ctatgttgct      60
ccttttacgc tatgtggata cgctgcttta atgcctttgt atcatgctat tgcttcccgt     120
atggctttca ttttctcctc cttgtataaa tcctggttgc tgtctcttta tgaggagttg     180
tggcccgttg tcaggcaacg tggcgtggtg tgcactgtgt ttgctgacgc aaccccccact     240
ggttggggca ttgccaccac ctgtcagctc ctttccggga ctttcgcttt ccccctccct     300
attgccacgg cggaactcat cgccgcctgc cttgcccgct gctggacagg gctcggctg     360
ttgggcactg acaattccgt ggtgttgtcg gggaaatcat cgtcctttcc ttggctgctc     420
gcctgtgttg ccacctggat tctgcgcggg acgtccttct gctacgtccc ttcggccctc     480
aatccagcgg accttccttc ccgcggcctg ctgccggctc tgcggcctct tccgcgtctt     540
cgccttcgcc ctcagacgag tcggatctct ctttgggccg cctccccgcc taagcttatc     600
gataccgtca gatctaact tgtttattgc agcttataat ggttacaaat aaagcaatag     660
catcacaaat ttcacaaata aagcatttt ttcactgcat tctagttgtg gtttgtccaa     720
actcatcaat gtatcttatc atgtctggat ctcgacctcg atagagcttg gctacgtag     780
ataagtagca tggcgggtta atcattaact acaaggaacc cctagtgatg agttggcca     840
ctccctctct gcgcgctcgc tcgctcactg aggccgggcg accaaggtc gcccgacgcc     900
cgggctttgc ccgggcggcc tcagtgagcg agcgagcgcg cagctggcgt aatagcgaag     960
aggcccgcac cgatcgccct tcccaacagt tgcgcagcct gaatggcgaa tggcgattcc    1020
gttgcaatgg ctggcggtaa tattgttctg gatattacca gcaaggccga tagtttgagt    1080
tcttctactc aggcaagtga tgttattact aatcaaagaa gtattgcgac aacggttaat    1140
ttgcgtgatg gacagactct tttactcggt ggcctcactg attataaaaa cacttctcag    1200
gattctggcg taccgttcct gtctaaaatc ccttttaatcg gcctcctgtt agctcccgc    1260
tctgattcta acgaggaaag cacgttatac gtgctcgtca aagcaaccat agtacgcgcc    1320
ctgtagcggc gcattaagcg cggcgggtgt ggtggttacg cgcagcgtga ccgctacact    1380
tgccagcgcc ctagcgcccg ctcctttcgc tttcttccct tcctttctcg ccacgttcgc    1440
cggctttccc cgtcaagctc taaatcgggg gctccctta gggttccgat ttagtgcttt    1500
acggcacctc gaccccaaaa aacttgatta gggtgatggt tcacgtagtg gccatcgcc    1560
ctgatagacg gttttttcgcc ctttgacgtt ggagtccacg ttctttaata gtggactctt    1620
gttccaaact ggaacaacac tcaaccctat ctcggtctat tcttttgatt tataagggat    1680
```

```
tttgccgatt tcggcctatt ggttaaaaaa tgagctgatt taacaaaaat ttaacgcgaa    1740
ttttaacaaa atattaacgt ttacaattta aatatttgct tatacaatct tcctgttttt    1800
ggggcttttc tgattatcaa ccggggtaca tatgattgac atgctagttt tacgattacc    1860
gttcatcgat tctcttgttt gctccagact ctcaggcaat gacctgatag cctttgtaga    1920
gacctctcaa aaatagctac cctctccggc atgaatttat cagctagaac ggttgaatat    1980
catattgatg gtgatttgac tgtctccggc ctttctcacc cgtttgaatc tttacctaca    2040
cattactcag gcattgcatt taaaatatat gagggttcta aaaattttta tccttgcgtt    2100
gaaataaagg cttctcccgc aaaagtatta cagggtcata atgttttggg tacaaccgat    2160
ttagctttat gctctgaggc tttattgctt aatttgcta attctttgcc ttgcctgtat    2220
gatttattgg atgttggaat tcctgatgcg gtatttctc cttacgcatc tgtgcggtat    2280
ttcacaccgc atatggtgca ctctcagtac aatctgctct gatgccgcat agttaagcca    2340
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctattttat aggttaatgt    2520
catgataata atggtttctt agacgtcagg tggcacttt cggggaaatg tgcgcggaac    2580
ccctatttgt ttatttttct aaatacattc aaatatgtat ccgctcatga caataaacc    2640
ctgataaatg cttcaataat attgaaaaag gaagagtatg agtattcaac atttccgtgt    2700
cgcccttatt ccctttttg cggcattttg ccttcctgtt tttgctcacc cagaaacgct    2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acggatggca tgacagtaag agaattatgc agtgctgcca taaccatgag    3060
tgataacact gcggccaact tacttctgac aacgatcgga ggaccgaagg agctaaccgc    3120
tttttttgcac aacatggggg atcatgtaac tcgccttgat cgttgggaac cggagctgaa    3180
tgaagccata ccaaacgacg agcgtgacac cacgatgcct gtagcaatgg caacaacgtt    3240
gcgcaaacta ttaactggcg aactacttac tctagcttcc cggcaacaat taatagactg    3300
gatgaggcg gataaagttg caggaccact tctgcgctcg gcccttccgg ctggctggtt    3360
tattgctgat aaatctggag ccggtgagcg tgggtctcgc ggtatcattg cagcactggg    3420
gccagatggt aagccctccc gtatcgtagt tatctacacg acggggagtc aggcaactat    3480
ggatgaacga aatagacaga tcgctgagat aggtgcctca ctgattaagc attggtaact    3540
gtcagaccaa gtttactcat atatacttta gattgattta aaacttcatt tttaatttaa    3600
aaggatctag gtgaagatcc ttttttgataa tctcatgacc aaaatccctt aacgtgagtt    3660
ttcgttccac tgagcgtcag acccccgtaga aaagatcaaa ggatcttctt gagatccttt    3720
ttttctgcgc gtaatctgct gcttgcaaac aaaaaaacca ccgctaccag cggtggtttg    3780
tttgccggat caagagctac caactctttt tccgaaggta actggcttca gcagagcgca    3840
gataccaaat actgtccttc tagtgtagcc gtagttaggc caccacttca agaactctgt    3900
agcaccgcct acatacctcg ctctgctaat cctgttacca gtggctgctg ccagtggcga    3960
taagtcgtgt cttaccgggt tggactcaag acgatagtta ccggataagg cgcagcggtc    4020
gggctgaacg gggggttcgt gcacacagcc cagcttggag cgaacgacct acaccgaact    4080
gagataccta cagcgtgagc tatgagaaag cgccacgctt cccgaaggga gaaaggcgga    4140
caggtatccg gtaagcggca gggtcggaac aggagagcgc acgagggagc ttccaggggg    4200
aaacgcctgg tatctttata gtcctgtcgg gtttcgccac ctctgacttg agcgtcgatt    4260
tttgtgatgc tcgtcagggg gcggagcct atggaaaaac gccagcaacg cggcctttt    4320
acggttcctg gccttttgct ggccttttgc tcacatgttc tttcctgcgt tatcccctga    4380
ttctgtggat aaccgtatta ccgcctttga gtgagctgat accgctcgcc gcagccgaac    4440
gaccgagcg agcgagtcag tgagcgagga agcggaagag cgcccaatac gcaaaccgcc    4500
tctccccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagggagt ggccaactcc atcactaggg gttccttgta gttaatgatt    4680
aacccgccat gctacttatc tacgtagcca tgctctagaa cattgattat tgactagtgg    4740
agttccgcgt tacataactt acggtaaatg gcccgcctgg ctgaccgccc aacgaccccc    4800
gcccattgac gtcaataatg acgtatgttc ccatagtaac gccaataggg acttccatt    4860
gacgtcaatg ggtggagtat ttacggtaaa ctgcccactt ggcagtacat caagtgtatc    4920
atatgccaag tacgcccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc ccccccct    5100
ccccacccc aatttttgtat ttatttattt tttaattatt ttgtgcagcg atggggggcg    5160
ggggggggg ggcgcgcgc caggcgggc ggggcgggc gaggggcggg gcgggcgag    5220
gcggagggt gcggcgcag ccaatcagag cggccgcctc cgaaagtttc cttttatggc    5280
gaggcggcac cggcggcggc cctataaaaa gcgaagcgcg cggcgggcgg gagtcgctgc    5340
gcgctgcctt cgccccgtgc cccgctccgc cgccgcctcg cgccgcccgc cccggctctg    5400
actgaccgcg ttactaaaac aggtaagtcc ggcctccgcg ccgggttttg gcgcctcccg    5460
cgggcgcccc cctcctcacg gcgagcgctg ccacgtcaga cgaagggcgc agcgctcgtc    5520
ctgatccttc cgcccggacg ctcaggacag cggcccgctg ctcataagac tcggccttag    5580
aaccccagta tcagcagaag gacatttag gacgggactt gggtgactct agggcactgg    5640
ttttctttcc agagagcgga acaggcgagg aaaagtagtc ccttctcggc gattctgcgg    5700
agggatctcc gtgggcggt gaacgccgat gatgcctcta ctaaccatgt tcatgttttc    5760
tttttttc tacaggtcct gggtgacgaa caggtaccg ccaccatggc caccggctct    5820
cgcacaagcc tgctgctggc tttcggactg ctgtgcctgc cttggctcca ggagggctcc    5880
gccgctagca tcgataccgt cgctatgtgc tggaggcttg ctgaaggctg tatgctgata    5940
cttcagcctg aatcgtgacc gttttggcct ctgactgacg gtcacgattg gctgaagtat    6000
caggacacaa ggcctgttac tagcactcac atggaacaaa tggcctctag cctggaggct    6060
tgctgaaggc tgtatgctga cttcactcat attgttccac tcgttttggc ctctgactga    6120
cgagtggaac aatgagtgaa gtcaggacac aaggcctgtt actagcactc acatggaaca    6180
aatgcctct agcctggagg cttgctgaag gctgtatgct gtatattcta caaatcacca    6240
gggcgttttg gcctctgact gacgccctgg tgatgtagaa tatacaggac acaaggcctg    6300
ttactagcac tcacatggaa caaatggcct ctctagaat                         6339
```

| SEQ ID NO: 14 | moltype = DNA   length = 6339 |
|---|---|
| FEATURE | Location/Qualifiers |
| source | 1..6339 |
| | mol_type = other DNA |
| | organism = synthetic construct |

SEQUENCE: 14

```
aatcaacctc tggattacaa aatttgtgaa agattgactg gtattcttaa ctatgttgct   60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aaccccact   240
ggttggggca ttgccaccac ctgtcagctc ctttccggga ctttcgcttt ccccctccct  300
attgccacgg cggaactcat cgccgcctgc cttgcccgct gctggacagg ggctcggctg  360
ttgggcactg acaattccgt ggtgttgtcg gggaaatcat cgtcctttcc ttggctgctc  420
gcctgtgttg ccacctggat tctgcgcggg acgtccttct gctacgtcct ttcggccctc  480
aatccagcgg accttccttc ccgcggcctg ctgccggctc tgcggcctct tccgcgtctt  540
cgccttcgcc ctcagacgag tcggatctcc ctttgggccg cctcccgcc taagcttatc   600
gataccgtcg agatctaact tgtttattgc agcttataat ggttacaaat aaagcaatag  660
catcacaaat ttcacaaata aagcattttt ttcactgcat tctagttgtg gtttgtccaa  720
actcatcaat gtatcttatc atgtctggat ctcgacctcg actagagcat ggctacgtag  780
ataagtagca tggcgggtta atcattaact acaaggaacc cctagtgatg gagttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc 1020
gttgcaatgg ctgcgggtaa tattgttctg gatattacca gcaaggccga tagtttgagt 1080
tcttctactc aggcaagtga tgttattact aatcaaagaa gtattgcgac aacgttaat  1140
ttgcgtgatg gacagactct tttactcggt ggcctcactg attataaaaa cacttctcag 1200
gattctggcg taccgttcct gtctaaaatc cctttaatcg gcctcctgtt tagctcccgc 1260
tctgattcta acgaggaaag cacgttatac gtgctcgtca aagcaaccat agtacgcgcc 1320
ctgtagcggc gcattaagcg cggcgggtgt ggtggttacg cgcagcgtga ccgctacact 1380
tgccagcgcc ctagcgcccg ctcctttcgc tttcttccct tcctttctcg ccacgttcgc 1440
cggctttccc cgtcaagctc taaatcgggg gctcccttta gggttccgat ttagtgcttt 1500
acggcacctc gaccccaaaa aacttgatta gggtgatggt tcacgtagtg gccatcgcc  1560
ctgatagacg gttttttcgcc ctttgacgtt ggagtccacg ttctttaata gtggactctt 1620
gttccaaaact ggaacaacac tcaacctat ctccggtcta tctttttgatt tataagggat 1680
tttgccgatt tcggcctatt ggttaaaaaa tgagctgatt taacaaaaat ttaacgcgaa 1740
ttttaacaaa atattaacgt ttacaattta aatatttgct tatacaatct tcctgttttt 1800
ggggcttttc tgattatcaa ccgggtaca tatgattgac atgctagttt tacgattacc 1860
gttcatcgat tctcttgttt gctccagact ctcaggcaat gacctgatag ccttttgtaga 1920
gacctctcaa aaatagctac cctctccggc atgaatttat cagctagacc ggttgaatat 1980
catattgatg gtgatttgac tgtctccggc ctttctcacc cgtttgaatc tttacctaca 2040
cattactcag gcattgcatt taaaatatat gagggttcta aaaatttta tccttgcgtt 2100
gaaataaagg cttctcccgc aaaagtatta cagggtcata atgtttttgg tacaaccgat 2160
ttagctttat gctctgaggc tttattgctt aattttgcta attctttgcc ttgcctgtat 2220
gatttattgg atgttggaat tcctgatgcg gtatttctc cttacgcatc tgtgcggtat 2280
ttcacaccgc atatggtgca ctctcagtac aatctgctct gatgccgcat agttaagcca 2340
gccccgacac ccgccaacac ccgctgacgc gccctgacgg gcttgtctgc tcccggcatc 2400
cgcttacaga caagctgtga ccgtctccgg gagctgcatg tgtcagaggt tttcaccgtc 2460
atcaccgaaa cgcgcgagac gaaagggcct cgtgatacgc ctatttttat aggttaatgt 2520
catgataata atggtttctt agacgtcagg tggcacttt cggggaaatg tgcgcggaac  2580
ccctatttgt ttatttttct aaatacattc aaatatgtat ccgctcatga caataaccct 2640
ctgataaatg cttcaataat attgaaaaag gaagagtatg agtattcaac atttccgtgt 2700
cgcccttatt ccctttttttg cggcattttg ccttcctgtt tttgctcacc cagaaacgct 2760
ggtgaaagta aaagatgctg aagatcagtt gggtgcacga gtgggttaca tcgaactgga 2820
tctcaacagc ggtaagatcc ttgagagttt tcgccccgaa gaacgttttc caatgatgag 2880
cacttttaaa gttctgctat gtggcgcggt attatcccgt attgacgccg ggcaagagca 2940
actcggtcgc cgcatacact attctcagaa tgacttggtt gagtactcac cagtcacaga 3000
aaagcatctt acggatggca tgacagtaag agaattatgc agtgctgcca taaccatgag 3060
tgataacact gcggccaact tacttctgac aacgatcgga ggaccgaagg agctaaccgc 3120
ttttttgcac aacatggggg atcatgtaac tcgccttgat cgttgggaac cggagctgaa 3180
tgaagccata ccaaacgacg agcgtgacac cacgatgcct gtagcaatgg caacaacgtt 3240
gcgcaaacta ttaactggcg aactacttac tctagcttcc cggcaacaat taatagactg 3300
gatggaggcg gataaagttg caggaccact tctgcgctcg gcccttccgg ctggctggtt 3360
tattgctgat aaatctggag ccggtgagcg tgggtctcgc ggtatcattg cagcactggg 3420
gccagatggt aagccctccc gtatcgtagt tatctacacg acggggagtc aggcaactat 3480
ggatgaacga aatagacaga tcgctgagat aggtgcctca ctgattaagc attggtaact 3540
gtcagaccaa gtttactcat atatacttta gattgattta aaacttcatt tttaatttaa 3600
aaggatctag gtgaagatcc ttttttgataa tctcatgacc aaaatccctt aacgtgagtt 3660
ttcgttccac tgagcgtcag accccgtaga aaagatcaaa ggatcttctt gagatccttt 3720
ttttctgcgc gtaatctgct gcttgcaaac aaaaaaacca ccgctaccag cggtggtttg 3780
tttgccggat caagagctac caactctttt tccgaaggta actggcttca gcagagcgca 3840
gataccaaat actgtccttc tagtgtagcc gtagttaggc caccacttca agaactctgt 3900
agcaccgcct acatacctcg ctctgctaat cctgttacca gtggctgctg ccagtggcga 3960
taagtcgtgt cttaccgggt tggactcaag acgatagtta ccggataagg cgcagcggtc 4020
gggctgaacg gggggttcgt gcacacagcc cagcttggag cgaacgacct acaccgaact 4080
gagataccta cagcgtgagc tatgagaaag cgccacgctt cccgaaggga gaaaggcgga 4140
caggtatccg gtaagcggca gggtcggaac aggagagcgc acgagggagc ttccaggggg 4200
aaacgcctgg tatctttata gtcctgtcgg gtttcgccac ctctgacttg agcgtcgatt 4260
tttgtgatgc tcgtcagggg ggcggagcct atggaaaaac gccagcaacg cggccttttt 4320
acggttcctg gccttttgct ggccttttgc tcacatgttc tttcctgcgt tatccccctga 4380
```

```
ttctgtggat aaccgtatta ccgcctttga gtgagctgat accgctcgcc gcagccgaac    4440
gaccgagcgc agcgagtcag tgagcgagga agcggaagag cgcccaatac gcaaaccgcc    4500
tctcccgcg  cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagagggagt ggccaactcc atcactaggg gttccttgta gttaatgatt    4680
aacccgccat gctacttatc tacgtagcca tgctctagga cattgattat tgactagtag    4740
agttccgcgt tacataactt acggtaaatg gcccgcctgg ctgaccgccc aacgaccccc    4800
gcccattgac gtcaataatg acgtatgttc ccatagtaac gccataggga ctttccatt     4860
gacgtcaatg ggtggagtat ttacgtaaa  ctgcccactt ggcagtacat caagtgtatc    4920
atatgccaag tacgccccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc tccccccct    5100
ccccaccccc aattttgtat ttatttattt tttaattatt ttgtgcagcg atgggggcgg    5160
ggggggggcg gggcgcgcgc caggcggggc ggggcggggc gaggggcggg gcggggcgag    5220
gcggagaggt gcggcggcag ccaatcagag cggcgcgctc cgaaagtttc cttttatggc    5280
gaggcggcgg cggcggcggc cctataaaaa gcgaagcgcg cggcgggcgg gagtcgctgc    5340
gcgctgcctt cgccccgtgc cccgctccgc cgccgcctcg cgccgcccgc cccggctctg    5400
actgaccgcg ttactaaaac aggtaagtcc ggcctccgcg ccgggttttg gcgcctcccg    5460
cgggcgcccc cctcctcacg gcgagcgctg ccacgtcaga cgaagggcgc agcgagcgtc    5520
ctgatccttc cgcccggacg ctcaggacag cggcccgctg ctcataagac tcggcctag    5580
aaccccagta tcagcagaag gacattttag gacgggactt gggtgactct agggcactgg    5640
ttttcttcc  agagagcgga acaggcgagg aaaagtagtc cttctcggc  gattctgcgg    5700
agggatctcc gtggggcggt gaacgccgat gatgcctcta ctaaccatgt tcatgttttc    5760
ttttttttc  tacaggtcct gggtgacgaa cagggtaccg ccaccatggc caccggctct    5820
cgcacaagcc tgctgctggc tttcggactg ctgtgcctgc cttggctcca ggagggctcc    5880
gccgctagca tcgataccgt cgctatgtgc tggaggcttg ctgaaggctg tatgctgtat    5940
aagtccagtg agaagaaggc gttttggcct ctgactgacg ccttcttctc tggacttata    6000
caggacacaa ggcctgttac tagcactcac atggaacaaa tggcctctag cctgaggct    6060
tgctgaaggc tgtatgctgc tatcatcaaa tgagctgctg cgttttggcc tctgactgac    6120
gcagcagctc ttgatgatag tcaggacaca aggcctgtta ctagcactca catggaacaa    6180
atggcctcta gcctgaggc  ttgctgaagg ctgtatgctg aagactgctg gaaattctat    6240
ggctgttttg gcctctgact gacgaccata gaatccagca gtctcaggac acaaggcctg    6300
ttactagcac tcacatggaa caaatggcct ctctagaat                           6339

SEQ ID NO: 15          moltype = DNA   length = 6340
FEATURE                Location/Qualifiers
source                 1..6340
                       mol_type = other DNA
                       organism = synthetic construct
SEQUENCE: 15
aatcaacctc tggattacaa aatttgtgaa agattgactg gtattcttaa ctatgttgct      60
ccttttacgc tatgtggata cgctgcttta atgcctttgt atcatgctat tgcttcccgt     120
atggctttca ttttctcctc cttgtataaa tcctggttgc tgtctcttta tgaggagttg     180
tggcccgttg tcaggcaacg tggcgtggtg tgcactgtgt ttgctgacgc aaccccact      240
ggttggggca ttgccaccac ctgtcagctc ctttccggga ctttgctttt cccctccct     300
attgccacgg cggaactcat cgccgcctgc cttgcccgct gctggacagg ggctcggctg    360
ttgggacttg acaattccgt ggtgttgtcg gggaaatcat cgtccttcc  ttggctgctc    420
gcctgtgttg ccacctggat tctgcgcggg acgtccttct gctacgtccc ttcggccctc    480
aatccagcgg accttccttc ccgcggcctg ctgccggctc tgcggcctct tccgcgtctt    540
cgccttcgcc ctcagacgag tcggatctcc ctttgggccg cctccccgcc taagcttatc    600
gataccgtcg agatctaact tgtttattgc agcttataat ggttacaaat aaagcaatag    660
catcacaaat ttcacaaata aagcattttt ttcactgcat tctagttgtg gtttgtccaa    720
actcatcaat gtatcttatc atgtctggat ctcgacctcg actagagcat ggctacgtag    780
ataagtagca tggcgggtta atcattaact acaaggaacc cctagtgatg gagttggcca    840
ctccctctct gcgcgctcgc tcgctcactg aggccggggc accaaaggtc gcccgacgcc    900
cgggctttgc ccgggcggcc tcagtgagcg agcgagcgcg cagctggcgt aatagcgaag    960
aggcccgcac cgatcgccct tcccaacagt tgcgcagcct gaatggcgaa tggcgattcc   1020
gttgcaatgg ctggcggtaa tattgttctg gatattacca gcaaggccga tagtttgagt   1080
tcttctactc aggcaagtga tgttattact aatcaaagaa gtattgcgac aacggttaat   1140
ttgcgtgatg gacagactct tttactcggt ggcctcactg attataaaaa cacttctcag   1200
gattctggcg taccgttcct gtctaaaatc cctttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg gctcccttta gggttccgat ttagtgcttt   1500
acggcacctc gaccccaaaa aacttgatta gggtgatggt tcacgtagtg gccatcgcc    1560
ctgatagacg ttttttcgcc ctttgacgtt ggagtccacg ttctttaata gtggactctt   1620
gttccaaact ggaacaacac tcaaccctat ctcggtctat tcttttgatt tataagggat   1680
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaattat  cagctagaac ggttgaatat   1980
catattgatg tgatttgac tgtctccggc ctttctcacc cgtttgaatc tttacctaca   2040
cattactcag gcattgcatt taaaatatat gagggttcta aaattttta tccttgcgtt   2100
gaaataaagg cttctcccgc aaaagtatta cagggtcata atgtttttgg tacaaccgat   2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
```

```
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctattttat aggttaatgt     2520
catgataata atgtttctt agacgtcagg tggcactttt cggggaaatg tgcgcggaac     2580
ccctatttgt ttatttttct aaatacattc aaatatgtat cgcgctcatga gacaataacc   2640
ctgataaatg cttcaataat attgaaaaag gaagagtatg agtattcaac atttccgtgt    2700
cgcccttatt ccctttttg cggcattttg ccttcctgtt tttgctcacc cagaaacgct     2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acgatggca tgacagtaag agaattatgc agtgctgcca taaccatgag     3060
tgataacact gcggccaact tacttctgac aacgatcgga ggaccgaagg agctaaccgc    3120
tttttttgcac aacatggggg atcatgtaac tcgccttgat cgttgggaac cggagctgaa   3180
tgaagccata ccaaacgacg agcgtgacac cacgatgcct gtagcaatgg caacaacgtt    3240
gcgcaaacta ttaactggcg aactacttac tctagcttcc cggcaacaat taatagactg    3300
gatggaggcg gataaagttg caggaccact tctgcgctcg gcccttccgg ctggctggtt    3360
tattgctgat aaatctggag ccggtgagcg tgggtctcgc ggtatcattg cagcactggg    3420
gccagatggt aagccctccc gtatcgtagt tatctcacg acgggagtc aggcaactat      3480
ggatgaacga aatagacaga tcgctgagat aggtgcctca ctgattaagc attggtaact   3540
gtcagaccaa gtttactcat atatacttta gattgattta aaacttcatt tttaatttaa   3600
aaggatctag gtgaagatcc tttttgataa tctcatgacc aaaatcccctt aacgtgagtt   3660
ttcgttccac tgagcgtcag accccgtaga aagatcaaa ggatcttctt gagatccttt     3720
ttttctgcgc gtaatctgct gcttgcaaac aaaaaaacca ccgctaccag cggtggtttg   3780
tttgccggat caagagctac caactctttt tccgaaggta actggcttca gcagagcgca   3840
gataccaaat actgtccttc tagtgtagcc gtagttaggc caccacttca agaactctgt   3900
agcaccgcct acatacctcg ctctgctaat cctgttacca gtggctgctg ccagtggcga   3960
taagtcgtgt cttaccgggt tggactcaag acgatagtta ccggataagg cgcagcggtc   4020
gggctgaacg gggggttcgt gcacacagcc cagcttggag cgaacgacct acaccgaact   4080
gagataccta cagcgtgagc tatgagaaag cgccacgctt cccgaaggga gaaaggcgga   4140
caggtatccg gtaagcggca gggtcggaac aggagagcgc acgagggagc ttccaggggg   4200
aaacgcctgg tatctttata gtcctgtcgg gtttcgccac ctctgacttg agcgtcgatt   4260
tttgtgatgc tcgtcagggg gcggagcct atggaaaaac gccagcaacg cggcctttt     4320
acggttcctg gccttttgct ggccttttgc tcacatgttc tttcctgcgt tatccctga    4380
ttctgtggat aaccgtatta ccgcctttga gtgagctgat accgctcgcc gcagccgaac   4440
gaccgagcgc agcgagtcag tgagcgagga agcgaagag cgcccaatac gcaaaccgcc    4500
tctccccgcg cgttggccga ttcattaatg cagcagctgc gcgctcgctc gctcactgag   4560
gccgcccggg caaagcccgg gcgtcgggcg acctttggtc gcccggcctc agtgagcgag   4620
cgagcgcgca gagagggagt ggccaactcc atcactaggg gttccttgta gttaatgatt   4680
aacccgccat gctacttatc tacgtagcca tgctctagga cattgattat tgactagtgg   4740
agttccgcgt tacataactt acggtaaatg gcccgcctgg ctgaccgccc aacgacccc    4800
gcccattgac gtcaataatg acgtatgttc ccatagtaac gccaataggg actttccatt   4860
gacgtcaatg ggtggagtat ttacggtaaa ctgcccactt ggcagtacat caagtgtatc   4920
atatgccaag tacgcccct attgacgtca atgacggtaa atggcccgcc tggcattatg   4980
cccagtacat gaccttatgg gactttccta cttggcagta catctacgta ttagtcatcg   5040
ctattaccat ggtcgaggtg agccccacgt tctgcttcac tctcccccatc tccccccct   5100
ccccaccccc aattttgtat ttatttattt tttaattatt tgtgcagcg atgggggcgg    5160
ggggggggggg gggcgcgcgc caggcggggc ggggcgggggc gagggcgggg gcgggggcgag 5220
gcggagaggt gcggcggcag ccaatcagag cggcgcgctc cgaaagtttc cttttatggc   5280
gaggcggcg cggcggcggc cctataaaaa gcgaagcgcg cggcgggcgg gagtcgctgc    5340
gcgctgcctt cgccccgtgc cccgctccgc cgccgcctcg cgccgcccgc cccggctctg   5400
actgaccgcg ttactaaaac aggtaagtcc ggcctccgcg ccgggttttg gcgcctcccg   5460
cgggcgcccc cctcctcacg cgcagcgctg ccacgtcaga cgaagggcgc agcgagcgtc   5520
ctgatccttc cgcccggacg ctcaggacag cggcccgctg ctcataagac tcggccttag   5580
aacccccagta tcagcagaag gacatttag gacgggactt gggtgactct agggcactgg   5640
tttttctttcc agagagcgga acaggcgagg aaaagtagtc ccttctcggc gattctgcgg   5700
agggatctcc gtggggcggt gaacgccgat gatgcctcta ctaaccatgt tcatgttttc    5760
tttttttttc tacaggtcct gggtgacgaa cagggtaccg ccaccatggc caccggctct   5820
cgcacaagcc tgctgctggc tttgactg ctgtgctgc cttggctcca ggagggctca      5880
gccgctagca tcgataccgt cgctatgtgc tggaggcttg ctgaaggctg tatgctgatt   5940
agcactggtg atttccggct gttttggcct ctgactgacg accggaaatc cagtgctaat   6000
caggacacaa ggcctgttac tagcactcac atggaacaaa tggcctctag cctggaggct   6060
tgctgaaggc tgtatgctga ttgagtttcg cattcttgtt gccgttttgg cctctgactg   6120
acggcaacaa gagcgaaact caacaggaca caaggcctct tactagcact cacatggaac   6180
aaatggcctc tagcctggag gcttgctgaa ggctgtatgc tgattgatca ggcaaacata   6240
gtcccgtttt ggcctctgac tgacgggact atgtgcctga tcaatcagga cacaaggcct   6300
gttactagca ctcacatgga acaaatggcc tctctagaat                         6340

SEQ ID NO: 16         moltype = DNA   length = 6339
FEATURE               Location/Qualifiers
source                1..6339
                      mol_type = other DNA
                      organism = synthetic construct
SEQUENCE: 16
aatcaacctc tggattacaa aatttgtgaa agattgactg gtattcttaa ctatgttgct     60
ccttttacgc tatgtggata cgctgcttta atgcctttgt atcatgctat tgcttcccgt    120
atggctttca ttttctcctc cttgtataaa tcctggttgc tgtctcttta tgaggagttg    180
tggcccgttg tcaggcaacg tggcgtggtg tgcactgtgt ttgctgacgc aacccccact    240
ggttgggca ttgccaccac ctgtcagctc ctttccggga ctttcgcttt ccccctccct     300
```

-continued

```
attgccacgg cggaactcat cgccgcctgc cttgcccgct gctggacagg ggctcggctg   360
ttgggcactg acaattccgt ggtgttgtcg gggaaatcat cgtcctttcc ttggctgctc   420
gcctgtgttg ccacctggat tctgcgcggg acgtccttct gctacgtccc ttcggccctc   480
aatccagcgg accttccttc ccgcggcctg ctgccggctc tgcggcctct tccgcgtctt   540
cgccttcgcc ctcagacgag tcggatctcc ctttgggacg cctccccgcc taagcttatc   600
gataccgtcg agatctaact tgtttattgc agcttataat ggttacaaat aaagcaatag   660
catcacaaat ttcacaaata aagcattttt ttcactgcat tctagttgtg gtttgtccaa   720
actcatcaat gtatcttatc atgtctggat ctcgacctcg actagagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatgcgaat ggcgattcc   1020
gttgcaatgg ctggcggtaa tattgttctg gatattacca gcaaggccga tagtttgagt  1080
tcttctactc aggcaagtga tgttattact aatcaaagaa gtattgcgac aacgttaat   1140
ttgcgtgatg gacagactct tttactcggt ggcctcactg attataaaaa cacttctcag  1200
gattctggcg taccgttcct gtctaaaatc cctttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg cgcagcgtga ccgctacact  1380
tgccagcgcc ctagcgcccg ctcctttcgc tttcttccct tcctttctcg ccacgttcgc  1440
cggctttccc cgtcaagctc taaatcgggg gctcccttta gggttccgat ttagtgcttt  1500
acggcacctc gaccccaaaa aacttgatta gggtgatggt tcacgtagtg ggccatcgcc  1560
ctgatagacg gttttcgcc ctttgacgtt ggagtccacg ttctttaata gtggactctt  1620
gttccaaact ggaacaacac tcaacccta ctcggtctat tcttttgatt tataagggat  1680
tttgccgatt tcggcctatt ggttaaaaaa tgagctgatt taacaaaaat ttaacgcgaa  1740
ttttaacaaa atattaacgt ttacaattta aatatttgct tatacaatct tcctgttttt  1800
ggggcttttc tgattatcaa ccgggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc cttttctcacc cgtttgaatc tttacctaca  2040
cattactcag gcattgcatt taaaatatat gagggttcta aaaattttta tccttgcgtt  2100
gaaataaagg cttctcccgc aaaagtatta cagggtcata atgttttttgg tacaaccgat  2160
ttagctttat gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgctgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctatttttat aggttaatgt  2520
catgataata atggtttctt agacgtcagg tggcactttt cggggaaatg tgcgcggaac  2580
ccctatttgt ttattttct aaatacattc aaatatgtat ccgctcatga gacaataacc  2640
ctgataaatg cttcaataat attgaaaaag gaagagtatg agtattcaac atttccgtgt  2700
cgcccttatt cccttttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg ggcaagagca  2940
actcggtcgc cgcatacact attctcagaa tgacttggtt gagtactcac cagtcacaga  3000
aaagcatctt acgatggca tgacagtaag agaattatgc agtgctgcca taaccatgag  3060
tgataacact gcggccaact tacttctgac aacgatcgga ggaccgaagg agctaaccgc  3120
ttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctgttt  3360
tattgctgat aaatctggag ccggtgagcg tgggtctcgc ggtatcattg cagcactggg  3420
gccagatggt aagccctccc gtatcgtagt tatctcacg acgggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatctag gtgaagatcc ttttgataa tctcatgacc aaaatccctt aacgtgagtt  3660
ttcgttccac tgagcgtcag accccgtaga aagatcaaa ggatcttctt gagatccttt  3720
ttttctgcgc gtaatctgct gcttgcaaac aaaaaaacca ccgctaccag cggtggtttg  3780
tttgccggat caagagctac caactctttt tccgaaggta actggcttca gcagagcga  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccgggt tggactcaag acgatagtta ccggataagg cgcagcggtc  4020
gggctgaacg gggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgagggagc ttccagggg   4200
aaacgcctgg tatctttata gtcctgtcgg gtttcgccac ctctgacttg agcgtcgatt  4260
tttgtgatgc tcgtcagggg gcggagcct atggaaaaac gccagcaacg cggcctttt   4320
acggttcctg gccttttgct ggccttttgc tcacatgttc tttcctgcgt tatccctga   4380
tctgtggat aaccgtatta ccgcctttga gtgagctgat accgctcgcc gcagccgaac  4440
gaccgagcgc agcgagtcag tgagcgagga agcggaagag cgcccaatac gcaaaccgcc  4500
tctccccgcg cgttggccga ttcattaatg cagcagctgc gcgctcgctc gctcactgag  4560
gccgcccggg caaagcccgg gcgtcgggcg acctttggtc gcccggcctc agtgagcgag  4620
cgagcgcgca gagggagt ggccaactcc atcactaggg gttccttgta gttaatgatt  4680
aacccgcat gctacttatc tacgtagcca tgctctagaa cattgattat tgactagtga  4740
agttccgcgt tacataactt acggtaaatg gcccgcctgg ctgaccgccc aacgacccc   4800
gcccattgac gtcaataatg acgtatgttc ccatagtaac gccaataggg actttccatt  4860
gacgtcaatg ggtggagtat ttacggtaaa ctgcccactt ggcagtacat caagtgtatc  4920
atatgccaag tacgccccct attgacgtca atgacggtaa atggcccgcc tggcattatg  4980
cccagtacat gaccttatgg gactttccta cttggcagta catctacgta ttagtcatcg  5040
```

```
ctattaccat ggtcgaggtg agccccacgt tctgcttcac tctccccatc tccccccct    5100
ccccacccc  aattttgtat ttatttattt tttaattatt ttgtgcagcg atggggggcgg  5160
gggggggggg gggcgcgcgc caggcggggc gggggcgggc gaggggcggg gcggggcgag   5220
gcggagaggt gcggcggcag ccaatcagag cggcgcgctc cgaaagtttc cttttatggc   5280
gaggcggcgg cggcggcgcg cctataaaaa gcgaagcgcg cggcgggcgg gagtcgctgc   5340
gcgctgcctt cgccccgtgc cccgctccgc cgccgcctcg cgccgcccgc cccggctctg   5400
actgaccgcg ttactaaaac aggtaagtcc ggcctccgcg ccgggttttg gcgcctcccg   5460
cgggcgcccc cctcctcacg gcgagcgctg ccacgtcaga cgaagggcgc agcgagcgtc   5520
ctgatccttc cgcccggacg ctcaggacag cggcccgctc ctcataagac tcggccttag   5580
aaccccagta tcagcagaag gacatttag gacgggactt gggtgactct agggcactgg   5640
ttttctttcc agagagcgga acaggcgagg aaaagtagtc ccttctcggc gattctgcgg   5700
agggatctcc gtggggcggt gaacgccgat gatgcctcta ctaaccatgt tcatgttttc   5760
tttttttttc tacaggtcct gggtgacgaa cagggtaccg ccaccatggc caccggctct   5820
cgcacaagcc tgctgctggc tttcgactgt cgtgcctgc cttggctcca ggagggctcc    5880
gccgctagca tcgataccgt cgctatgtgc tggaggcttg ctgaaggctg tatgctgtct   5940
gatcgtggtg ttatttgggc gttttggcct ctgactgacg cccaaataac cacgatcaga   6000
caggacacaa ggcctgttac tagcactcac atggaacaaa tggcctctag cctggaggct   6060
tgctgaaggc tgtatgctgt tgagtttcgc attcttgttg ccgttttcgc ctctgactga   6120
cggcaacaag agcgaaactc aacaggacac aaggcctgtt actagcactc acatggaaca   6180
aatggcctct agcctggagg cttgctgaag gctgtatgct gtatcctctt ataactcagc   6240
ctccgttttg gcctctgact gacgaggct gagataagag gatacaggac acaaggcctg    6300
ttactagcac tcacatggaa caaatggcct ctctagaat                          6339

SEQ ID NO: 17           moltype = DNA   length = 6339
FEATURE                 Location/Qualifiers
source                  1..6339
                        mol_type = other DNA
                        organism = synthetic construct
SEQUENCE: 17
aatcaacctc tggattacaa aatttgtgaa agattgactg gtattcttaa ctatgttgct    60
ccttttacgc tatgtggata cgctgcttta atgcctttgt atcatgctat tgcttccgt    120
atggctttca ttttctcctc cttgtataaa tcctggttgc tgtctcttta tgaggagttg   180
tggcccgttg tcaggcaacg tggcgtggtg tgcactgtgt ttgctgacgc aacccccact   240
ggttggggca ttgccaccac ctgtcagctc ctttccggga ctttcgcttt ccccctcctt   300
attgccacgg cggaactcat cgccgcctgc cttgcccgct gctgacagg ggctcggctg    360
ttgggcactg acaattccgt ggtgttgtcg gggaaatcat cgtcctttcc ttggctgctc   420
gcctgtgttg ccacctggat tctgcgcggg acgtccttct gctacgtccc ttcggccctc   480
aatccagcgg accttccttc ccgcggcctg ctgccggctc tgcggcctct tccgcgtctt   540
cgccttgcc ctcagacgag tcggatctcc cttgggcg cctccccgcc taagcttatc      600
gataccgtcg agatctaact tgtttattgc agcttataat ggttacaaat aaagcaatag   660
catcacaaat ttcacaaata aagcattttt tcactgcat tctagttgtg gtttgtccaa    720
actcatcaat gtatcttatc atgtctggat ctcgacctcg actagagcat ggctacgtag   780
ataagtagca tggcgggtta atcattaact acaaggaact cctagtagtg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatggcgaa tggcgattcc   1020
gttgcaatgg ctggcggtaa tattgttctg gatattacca gcaaggccga tagtttgagt   1080
tcttctactc aggcaagtga tgttattact aatcaaagaa gtattgcgac aacggttaat   1140
ttgcgtgatg gacagactct tttactcggt ggcctcactg attataaaaa cacttctcag   1200
gattctggcg taccgttcct gtctaaaatc cctttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg gctcccttta gggttccgat ttagtgcttt   1500
acggcacctc gaccccaaaa aacttgatta gggtgatggt tcacgtagtg ggccatcgcc   1560
ctgatagacg gttttcgcc ctttgacgtt ggagtccacg ttctttaata gtggactctt    1620
gttccaaact ggaacaacac tcaacctat ctcggtctat tcttttgatt tataagggat    1680
tttgccgatt tcggcctatt ggttaaaaaa tgagctgatt taacaaaat ttaacgcgaa    1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaatttat cagctagaac ggttgaatat   1980
catattgatg gtgatttgac tgtctccggc ctttctcacc cgtttgaatc tttacctaca   2040
cattactcag gcattgcatt taaaatatat gagggttcta aaattttta tccttgcgtt   2100
gaaataaagg cttctcccgc aaaagtatta cagggtcata atgtttttgg tacaaccgat   2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
gccccgacac ccgccaacac ccgctgacgc gccctgacgg gcttgtctgc tcccggcatc   2400
cgcttacaga caagctgtga ccgtctccgg gagctgcatg tgtcagaggt tttcaccgtc   2460
atcaccgaaa cgcgcgagac gaaagggcct cgtgatacgc ctatttttat aggttaatgt   2520
catgataata atggtttctt agacgtcagg tggcactttt cggggaaatg tgcgcggaac   2580
ccctatttgt ttatttttct aaatacattc aaatatgtat ccgctcatga caataaccc    2640
ctgataaatg cttcaataat attgaaaaag gaagagtatg agtattcaac atttccgtgt   2700
cgcccttatt ccctttttg cggcattttg ccttcctgtt tttgctcacc cagaaacgct    2760
ggtgaaagta aaagatgctg aagatcagtt gggtgcacga gtgggttaca tcgaactgga   2820
tctcaacagc ggtaagatcc ttgagagttt tcgccccgaa gaacgttttc caatgatgag   2880
cacttttaaa gttctgctat gtggcgcggt attatcccgt attgacgccg ggcaagagca   2940
actcggtcgc cgcatacact attctcagaa tgacttggtt gagtactcac cagtcacaga   3000
```

-continued

```
aaagcatctt acggatggca tgacagtaag agaattatgc agtgctgcca taaccatgag 3060
tgataacact gcggccaact tacttctgac aacgatcgga ggaccgaagg agctaaccgc 3120
ttttttgcac aacatggggg atcatgtaac tcgccttgat cgttgggaac cggagctgaa 3180
tgaagccata ccaaacgacg agcgtgacac cacgatgcct gtagcaatgg caacaacgtt 3240
gcgcaaacta ttaactggcg aactacttac tctagcttcc cggcaacaat taatagactg 3300
gatggaggcg gataaagttg caggaccact tctgcgctcg gcccttccgg ctggctggtt 3360
tattgctgat aaatctggag ccggtgagcg tgggtctcgc ggtatcattg cagcactggg 3420
gccagatggt aagccctccc gtatcgtagt tatctacacg acggggagtc aggcaactat 3480
ggatgaacga aatagacaga tcgctgagat aggtgcctca ctgattaagc attggtaact 3540
gtcagaccaa gtttactcat atatacttta gattgattta aaacttcatt tttaatttaa 3600
aaggatctag gtgaagatcc ttttttgataa tctcatgacc aaaatccctt aacgtgagtt 3660
ttcgttccac tgagcgtcag acccccgtaga aaagatcaaa ggatcttctt gagatccttt 3720
ttttctgcgc gtaatctgct gcttgcaaac aaaaaaacca ccgctaccag cggtggtttg 3780
tttgccggat caagagctac caactctttt tccgaaggta actggcttca gcagagcgca 3840
gataccaaat actgtccttc tagtgtagcc gtagttaggc caccacttca agaactctgt 3900
agcaccgcct acatacctcg ctctgctaat cctgttacca gtggctgctg ccagtggcga 3960
taagtcgtgt cttaccgggt tggactcaag acgatagtta ccggataagg cgcagcggtc 4020
gggctgaacg gggggttcgt gcacacagcc cagcttggag cgaacgacct acaccgaact 4080
gagataccta cagcgtgagc tatgagaaag cgccacgctt cccgaaggga gaaaggcgga 4140
caggtatccg gtaagcggca gggtcggaac aggagagcgc acgagggagc ttccaggggg 4200
aaacgcctgg tatctttata gtcctgtcgg gtttcgccac ctctgacttg agcgtcgatt 4260
tttgtgatgc tcgtcagggg gcggagcct atggaaaaac gccagcaacg cggccttttt 4320
acggttcctg gccttttgct ggccttttgc tcacatgttc tttcctgcgt tatccctga 4380
ttctgtggat aaccgtatta ccgcctttga gtgagctgat accgctcgcc gcagccgaac 4440
gaccgagcgc agcgagtcag tgagcgagga agcgaagag cgcccaatac gcaaaccgcc 4500
tctccccgcg cgttggccga ttcattaatg cagcagctgc gcgctcgctc gctcactgag 4560
gccgcccggg caaagcccgg gcgtcgggcg acctttggtc gcccggcctc agtgagcgag 4620
cgagcgcgca gagagggagt ggccaactcc atcactaggg gttccttgta gttaatgatt 4680
aacccgccat gctacttatc tacgtagcca tgctctagga cattgattat tgactagtgg 4740
agttccgcgt tacataactt acggtaaatg ccccgcctgg ctgaccgccc aacgacccc 4800
gcccattgac gtcaataatg acgtatgttc ccatagtaac gccaataggg actttccatt 4860
gacgtcaatg ggtggagtat ttacggtaaa ctgcccactt ggcagtacat caagtgtatc 4920
atatgccaag tacgccccct attgacgtca atgacggtaa atggcccgcc tggcattatg 4980
cccagtacat gaccttatgg gactttccta cttggcagta catctacgta ttagtcatcg 5040
ctattaccat ggtcgaggtg agccccacgt tctgcttcac tctccccatc tccccccct 5100
ccccaccccc aatttttgtat tatttattt tttaattatt ttgtgcagcg atggggggcgg 5160
ggggggggg gggcgcgcgc caggcggggc ggggcgggc gaggggcggg gcggggcgag 5220
gcggagaggt gcggcggcag ccaatcagag cggcgcgctc cgaaagtttc cttttatggc 5280
gaggcggcgg cggcggcggc cctataaaaa gcgaagcgcg cggcggggcg gagtcgctgc 5340
gcgctgcctt cgccccgtgc cccgctccgc cgccgcctcg cgccgcccgc cccggctctg 5400
actgaccgcg ttactaaaac aggtaagtcc ggcctccgcg ccgggttttg gcgcctcccg 5460
cgggcgcccc cctcctcacg gcgagcgctg ccacgtcaga cgaagggcgc agcgagcgtc 5520
ctgatccttc cgcccggacg ctcaggacag cggcccgctg ctcataagac tcggccttag 5580
aaccccagta tcagcagaag gacattttag gacgggactt gggtgactct agggcactgg 5640
ttttcttttcc agagagcgga acaggcgagg aaaagtagtc ccttctcggc gattctgcgg 5700
agggatctcc gtgggggcgt gaacgccgat gatgcctcta ctaaccatgt tcatgttttc 5760
tttttttttc tacaggtcct gggtgacgaa cagggtaccg ccaccatggc caccggctct 5820
cgcacaagcc tgctgctggc tttcggactg ctgtgcctgc cttggctcca ggagggctcc 5880
gccgctagca tcgataccgt cgctatgtgc tggaggcttg ctgaaggctg tatgctgtcg 5940
tactgacttg taggtatgcc gttttggcct ctgactgacg gcatacctaa gtcagtacgt 6000
caggacacaa ggcctgttac tagcactcac atggaacaaa tggcctctag cctgaggct 6060
tgctgaaggc tgtatgctga ctcctaatca atagcttcca ccgttttggc ctctgactga 6120
cggtggaagc ttgattagga gtcaggacac aaggcctgtt actagcactc acatggaaca 6180
aatgcctct agcctggagg cttgctgaag gctgtatgct gaatatgcct ttaagctttg 6240
ctgcgttttg gcctctgact gacgcagcaa agcaaaggca tattcaggac acaaggcctg 6300
ttactagcac tcacatggaa caaatggcct ctctagaat 6339
```